US009001384B2

(12) United States Patent  
Megawa et al.

(10) Patent No.: US 9,001,384 B2  
(45) Date of Patent: Apr. 7, 2015

(54) MARK FORMING APPARATUS, IMAGE FORMING APPARATUS, AND MARK FORMING METHOD

(75) Inventors: Shunichi Megawa, Shizuoka-ken (JP); Takahiro Hagiwara, Chiba-ken (JP); Kazunori Hirabayashi, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 112 days.

(21) Appl. No.: 13/609,901

(22) Filed: Sep. 11, 2012

(65) Prior Publication Data

US 2013/0070265 A1 Mar. 21, 2013

Related U.S. Application Data

(60) Provisional application No. 61/536,205, filed on Sep. 19, 2011.

(51) Int. Cl.
*H04N 1/60* (2006.01)
*H04N 1/40* (2006.01)
*B41M 7/00* (2006.01)
*G03G 15/00* (2006.01)
*G03G 21/00* (2006.01)

(52) U.S. Cl.
CPC . *H04N 1/60* (2013.01); *H04N 1/40* (2013.01); *B41M 7/00* (2013.01); *G03G 15/5062* (2013.01); *G03G 15/55* (2013.01); *G03G 21/00* (2013.01)

(58) Field of Classification Search
None
See application file for complete search history.

(56) References Cited

U.S. PATENT DOCUMENTS

| 5,574,538 | A  | * | 11/1996 | Takahashi et al. ............... 399/71 |
| 6,095,164 | A  | * | 8/2000  | Saitoh et al. .................. 134/113 |
| 6,801,723 | B2 | * | 10/2004 | Herrmann et al. ................ 399/2  |
| 2004/0105700 | A1 | * | 6/2004 | Herrmann et al. ............ 399/159 |
| 2005/0185220 | A1 | * | 8/2005 | Martinez ...................... 358/1.18 |
| 2009/0154970 | A1 |   | 6/2009 | Yoshida et al. |
| 2010/0271410 | A1 |   | 10/2010 | Kaneko et al. |
| 2012/0145023 | A1 |   | 6/2012 | Yoshida et al. |

FOREIGN PATENT DOCUMENTS

| JP | 07-239630 | 9/1995 |
| JP | 2008-238754 | 10/2008 |
| JP | 2009-143231 | 7/2009 |
| JP | 2010-253949 | 11/2010 |

OTHER PUBLICATIONS

Notification of Reason(s) for Refusal for Japanese Patent Application No. 2012-200569 Dated Apr. 1, 2014, 2 pgs.

* cited by examiner

*Primary Examiner* — Kimberly A Williams
(74) *Attorney, Agent, or Firm* — Amin, Turocy & Watson, LLP

(57) ABSTRACT

A mark forming apparatus according to the present embodiment includes an image acquisition portion, a calculation portion, a detection portion, and a formation portion. The image acquisition portion scans and acquires an image formed on a sheet. The calculation portion calculates a color material attachment amount of the image from the image acquired by the image acquisition portion. The detection portion detects a predetermined mark which is already formed on the sheet. The formation portion forms a predetermined mark with a shape according to the color material attachment amount calculated by the calculation portion on the sheet in addition to the existing predetermined mark detected by the detection portion.

20 Claims, 29 Drawing Sheets

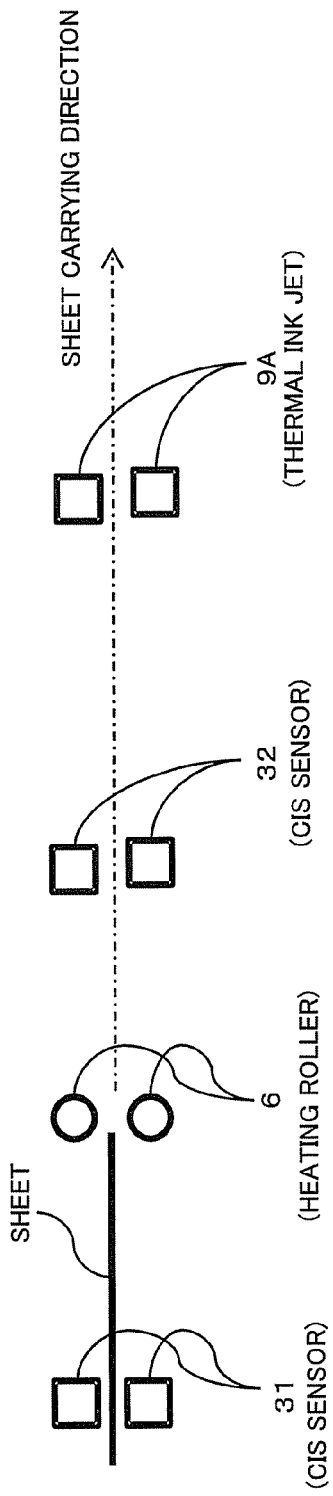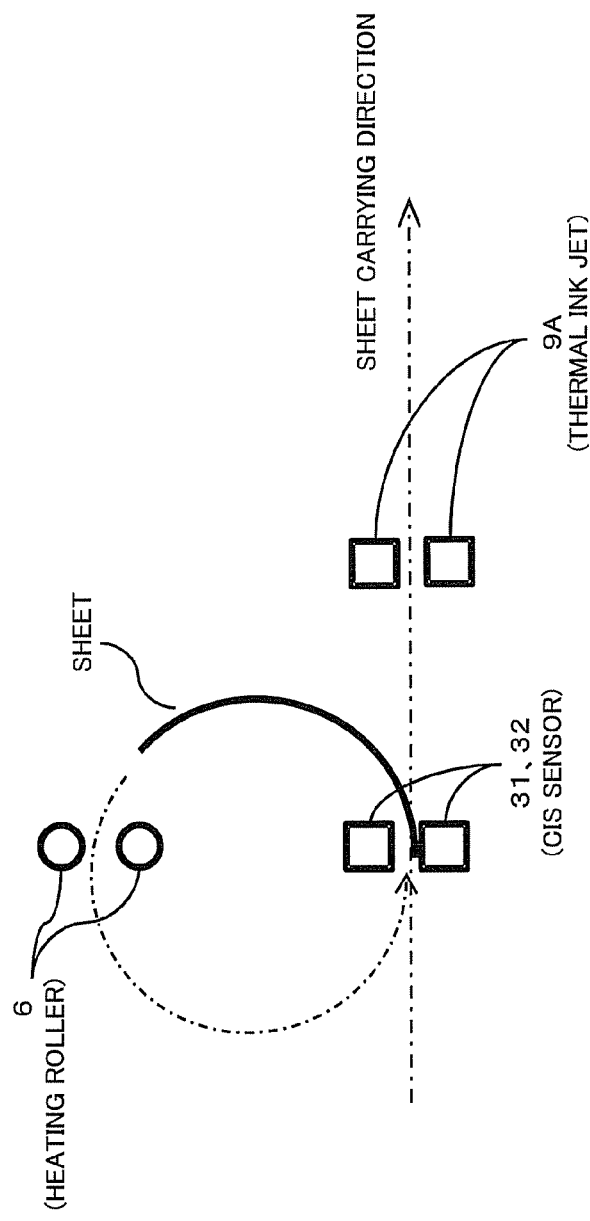

(CALCULATED PROJECTION)

ORIGINAL IMAGE

SUPERIMPOSE FIGURES

SUPERIMPOSE QR CODE

MARK FORMING APPARATUS, IMAGE FORMING APPARATUS, AND MARK FORMING METHOD

CROSS-REFERENCE TO RELATED APPLICATIONS

This application is based upon and claims the benefit of priority from: U.S. provisional application 61/536,205, filed on Sep. 19, 2011; the entire contents all of which are incorporated herein by reference.

FIELD

Embodiments described herein relate generally to a technique for enabling a user to ascertain deterioration of a sheet due to reuse thereof.

BACKGROUND

There is a color material which is decolorized when heated to a predetermined temperature or higher, and there is an image forming apparatus which performs printing on a sheet using this color material as a decolorable toner. In addition, there is a decolorizing apparatus which achieves reuse of a used sheet by heating the sheet to a predetermined temperature or higher. By the use of these apparatuses, it is possible to reduce environmental loads due to use of sheets.

A sheet deteriorates through repeated uses, but there is an image forming apparatus which manages accumulated deterioration of the sheet.

However, in a technique in the related art, a user cannot discriminate the deterioration extent of a sheet without using a specific instrument.

DESCRIPTION OF THE DRAWINGS

FIG. 8A is a diagram illustrating a disposition example of respective units (series disposition).

FIG. 8B is a diagram illustrating a disposition example of the respective units (application of a sensor).

DETAILED DESCRIPTION

Figure 1:
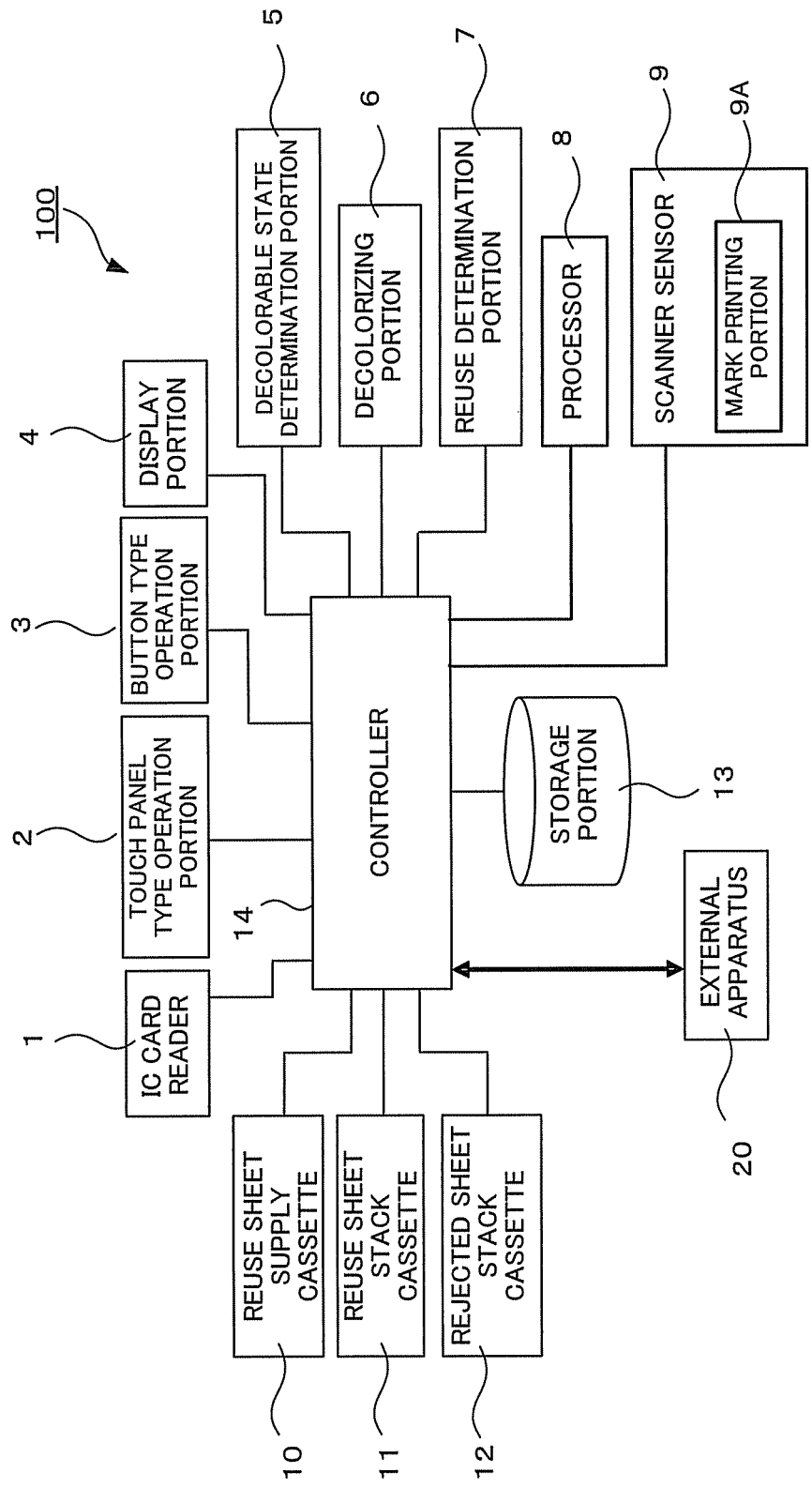
FIG. 1 is a diagram illustrating a configuration example of a recording medium reproducing apparatus.

A mark forming apparatus according to the present embodiment includes an image acquisition portion, a calculation portion, a detection portion, and a formation portion. The image acquisition portion scans and acquires an image formed on a sheet. The calculation portion calculates a color material attachment amount of the image from the image acquired by the image acquisition portion. The detection portion detects a predetermined mark which is already formed on the sheet. The formation portion forms a predetermined mark shape according to the color material attachment amount calculated by the calculation portion on the sheet in addition to the existing predetermined mark detected by the detection portion.

An image forming apparatus according to the present embodiment includes an image acquisition portion, a calculation portion, and a formation portion. The image acquisition portion acquires an image formed on a sheet. The calculation portion calculates a color material attachment amount of the image from the image acquired by the image acquisition portion. The formation portion forms information indicating the color material attachment amount calculated by the calculation portion on the sheet.

According to the apparatus according to each of the following embodiments, a user can check a deterioration extent of a sheet without using a special instrument, and thus can understand a reuse limit from the deterioration extent of the sheet. In each of the following embodiments, an implementation example where an operation is mainly performed by a decolorizing apparatus will be described, but an image forming apparatus with a decolorizing function may perform the operation.

An apparatus as an aspect scans a sheet before decolorizing, and calculates a toner attachment amount (color material attachment amount) of a currently formed image on the basis of a pixel value of the scanned image. The apparatus scans a sheet, detects a mark indicating a sheet deterioration extent, and calculates a sheet deterioration extent (an accumulated amount of an attached color material) accumulated up to the previous printing and decolorizing.

The toner attachment amount may be a sheet deterioration extent which occurs due to formation of an image currently on a sheet.

The apparatus forms a mark with a shape according to the calculated toner attachment amount (that is, a sheet deterioration extent) on the sheet after the image is decolorized. If a mark is already formed, a new mark is formed in addition to the existing mark.

An apparatus as another aspect performs scanning of an image before decolorizing, but performs scanning for detecting a mark after the decolorizing. A part other than the mark is decolorized, and thus the mark is easily detected. An apparatus according to still another aspect performs both calculation of a toner attachment amount and detection of a mark from an image which is acquired through scanning before decolorizing. In other words, the scanning of an image and the detection of a mark are performed using a single scanning unit. According to this aspect, scanning after the decolorizing is not necessary. In this case, in order to discriminate a printing content from a mark, a difference in colors between a decolorable toner and a sheet deterioration mark is used. In addition, in order to discriminate the printing content from the mark, the printed position of the mark indicating sheet deterioration is restricted.

As an aspect, a shape of a mark indicating sheet deterioration enables the number of printings, a deterioration extent per time, and an accumulated sheet deterioration extent to be understood by appearance. For example, a shape of the mark is an arrow shape, and the present apparatus forms an arrow with a length according to a calculated toner attachment amount in addition to an existing mark each time decolorizing is performed. The arrow mark is formed such that a start end of a new arrow mark comes to a terminal end position (an arrow head of the arrow) of the existing arrow mark, and a direction of the existing arrow mark is the same as a direction of the new arrow mark. Thereby, it is possible to indicate the number of reuses using the number of arrows (a mark shape is accumulatively continuous shape, but the number thereof is obtained since the arrow heads become break marks), and it is possible to indicate an accumulated amount of attached toner using the length (the total length) of the arrows. In addition, as another example, the present apparatus expresses a mark as a concentric circle, and increases a radius of the circle according to a calculated toner attachment amount. The apparatus sets a length obtained by adding a length according to the toner attachment amount to the outermost radial length of an existing circular mark as a radius of a new circular mark, and forms the new circular mark so as to form a concentric circle (the center thereof conforms to that of the existing circular mark). Thereby, it is possible to indicate the number of reuses using the number of circumferences, and it is possible to indicate an accumulated amount of sheet deterioration using the size of the circle. As another example, there may be implementation in which a hole is punched in a sheet instead of a mark, and a gap between the holes increases according to a toner attachment amount. It is possible to indicate the number of reuses using the number of holes and to thereby indicate a toner attachment amount using a position of the hole.

As an aspect, the apparatus prints a mark indicating sheet deterioration on both surfaces of the sheet. On the other hand, in an operation where the sheet is supplied when a user is conscious of the front and the rear of a sheet, a mark indicating a sheet deterioration extent of both surfaces of the sheet is printed on only one side.

As an aspect, the apparatus changes discharge destinations of a sheet according to an accumulated deterioration extent. In addition, the apparatus compares the magnitude of deterioration extent levels of both the surfaces of the sheet, and reverses and discharges the sheet such that the surface with the lower deterioration extent level faces upward and thus becomes the next printing surface.

In addition, as an aspect, if a reuse limit arrives, the apparatus prints a mark indicating the limit on a sheet. Thereby, a user can understand that the sheet is not appropriate for reuse any longer. As another aspect, the apparatus provides a user interface for adjusting deterioration extent detection.

Here, an outline of each embodiment will be described.

First embodiment: A description will be made of an implementation example where a toner attachment amount is grasped through scanning before decolorizing, and an arrow is detected through scanning after the decolorizing. In addition, a description will be made of an implementation example where an arrow with a length according to a toner attachment amount is added to a right end of a sheet, and toner attachment amounts of both the front and rear surfaces are respectively recorded on the surfaces. Further, a description will be made of an example of printing a concentric circle, an example of printing toner attachment amounts of both the front and rear surfaces on one surface, and an example of punching a hole, instead of an arrow as a mark of a detection target.

Second embodiment: A description will be made of an implementation example where detection of an arrow is also performed before decolorizing. Thereby, it is possible to reduce the number of scannings to one. In the second embodiment, a description will be made of an implementation example of using a difference in colors between a decolorable toner and an arrow, and an implementation example of being capable of detecting an arrow even before decolorizing by printing the mark at a predefined position.

Third embodiment: A description will be made of an implementation example where the entire sheet is divided into arbitrary regions, and a toner attachment amount is recorded for each region.

Fourth embodiment: A description will be made of an implementation example where a discharge tray is changed depending on an accumulated amount of attached toner, a deterioration extent difference between the front and rear surfaces is detected, and a sheet is reversed and discharged such that the upper surface becomes a surface with a small deterioration extent.

Fifth embodiment: A description will be made of an implementation example of showing a user that a sheet arrives at a reuse limit. In the fifth embodiment, a description will be made of an implementation example of printing an x mark or "non-usable" when exceeding the limit, or an implementation example of printing a number mark (for example, an arrow) so as to protrude from a sheet if the limit is exceeded.

Sixth embodiment: A user interface for adjusting deterioration extent detection is provided. As an example, a description will be made of a user interface which can set changing between only a number and a deterioration extent or adjust a threshold value of a deterioration extent.

Seventh embodiment: A description will be made of an implementation example of printing a deterioration mark with a decolorable toner on an image forming apparatus side. Since a deterioration extent is recorded during printing, the deterioration extent becomes more accurate.

Apparatus Configuration

FIG. 1 is a block diagram illustrating a schematic hardware configuration of a recording medium reproducing apparatus (decolorizing apparatus) in each embodiment.

In the recording medium reproducing apparatus which decolorizes an image on a recording medium (sheet) on which the image is formed so as to be reusable, the recording medium reproducing apparatus 100 includes a reuse sheet supply cassette 10 which sets sheets from which an image is desired to be decolorized, a decolorable state determination portion 5 which detects a thickness of a supplied sheet or foreign substances therefrom, a decolorizing portion 6 which performs decolorizing by heating at a predetermined temperature or higher, and a reuse determination portion 7 which determines whether or not a sheet is reusable after the decolorizing.

In addition, the recording medium reproducing apparatus 100 includes a reuse sheet stack cassette 11 which stacks sheets which are determined as being reusable after decolorizing, and a rejected sheet stack cassette 12 which stacks sheets which are determined as being undecolorable by the decolorable state determination portion 5 or determined as being non-reusable by the reuse determination portion 7. Further, the recording medium reproducing apparatus 100 includes a display portion 4 which displays a screen for acquiring job modes which can be selected by a user, set values, or the like from the user, a touch panel type operation portion 2 which receives an input from a user such as displayed job modes, a button type operation portion 3 where a button operation is possible, and an IC card reader 1 which performs a personal authentication of a user.

The recording medium reproducing apparatus 100 includes one or a plurality of scanner sensors 9 which scan a sheet before or after an image is decolorized. The reuse determination portion 7 determines reuse on the basis of scanning data acquired from the scanner sensor 9. In addition, the scanner sensor 9 has a mark printing portion 9A which performs printing with a color material which is not decolorized by the decolorizing portion 6.

The respective devices in the recording medium reproducing apparatus 100 are controlled by a controller 14. The controller 14 is provided with a storage portion 13 (a memory, a hard disk drive or the like) which records data such as job history, the number of decolorized sheets, and the number of rejected sheets, in various units, such as the user unit, the department unit, the day of the week unit, the week unit, and the month unit. In addition, the controller 14 includes a processor 8 which operates and executes a program introduced in the storage portion 13 in advance. The storage portion 13 or the processor 8 is provided on a board of the controller 14. Further, the controller 14 can transmit and receive information to and from an external apparatus 20 such as a network server or an image forming apparatus via, for example, a LAN line.

Based on the apparatus configuration, each embodiment will be described below. In addition, a configuration other than the apparatus configuration will be described in each embodiment.

First Embodiment

In the first embodiment, a toner attachment amount accumulated in a sheet is calculated as an extent of sheet deterioration, and a user understands sheet deterioration through printing on the sheet even without using a special instrument. In addition, if a toner attachment amount increases, there are cases where when printing is performed on a reusable sheet again, jamming occurs in the image forming apparatus body, and poor transfer or poor fixing occurs when printing is performed. These inconveniences caused by the reusable sheet can be reduced by aspects of the first embodiment.

In addition, in the first embodiment, a toner attachment amount per time is expressed by a length of an arrow which is printed on a sheet. The recording medium reproducing apparatus 100 sets a direction of an upward arrow to a forward direction, and additionally prints an arrow at the right end of a corresponding page in the upper direction each time printing or decolorizing is repeatedly performed.

Figure 2:
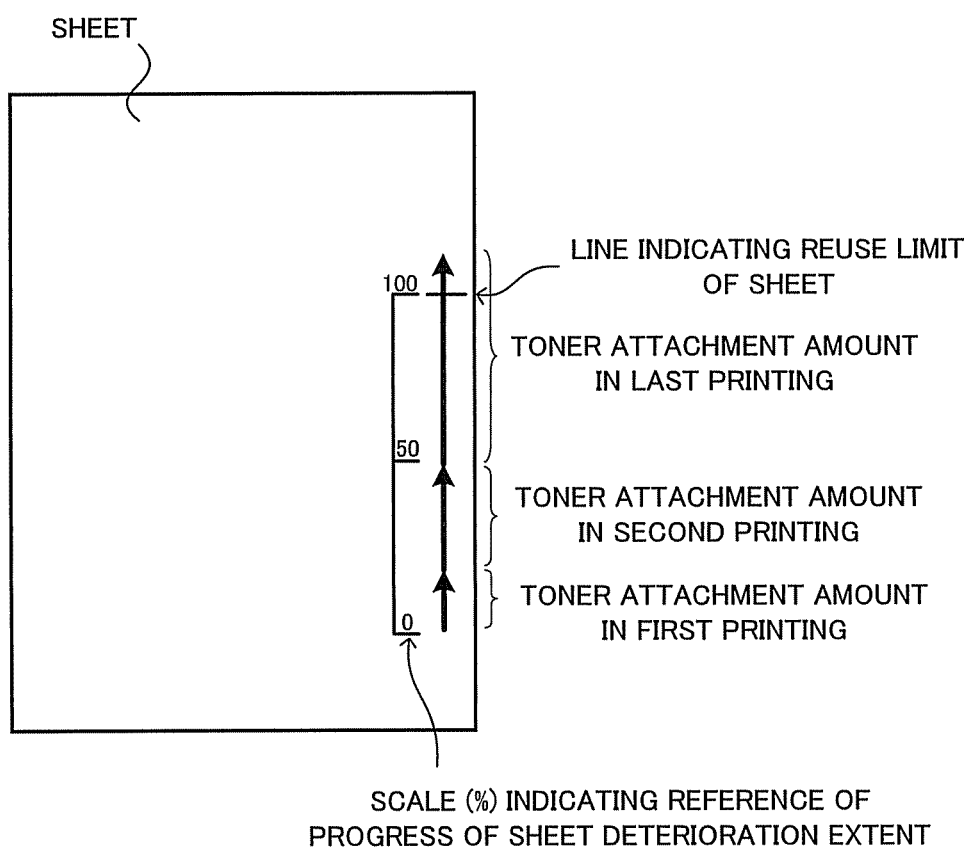
FIG. 2 is a diagram illustrating an example of the case where a deterioration mark (predetermined mark) formed by the recording medium reproducing apparatus is an arrow.

FIG. 2 shows a detailed printing example. The recording medium reproducing apparatus 100 prints an arrow at a blank portion of the right end of the sheet. A length of each arrow is set depending on a toner attachment amount per time. As shown in FIG. 2, the mark printing portion 9A of the recording medium reproducing apparatus 100 may print a line indicating a reuse limit of a sheet or a scale indicating a reference of progress of a sheet deterioration extent. A position of the line indicating a reuse limit is set, for example, depending on a predefined value or a calculation equation.

Figure 3:
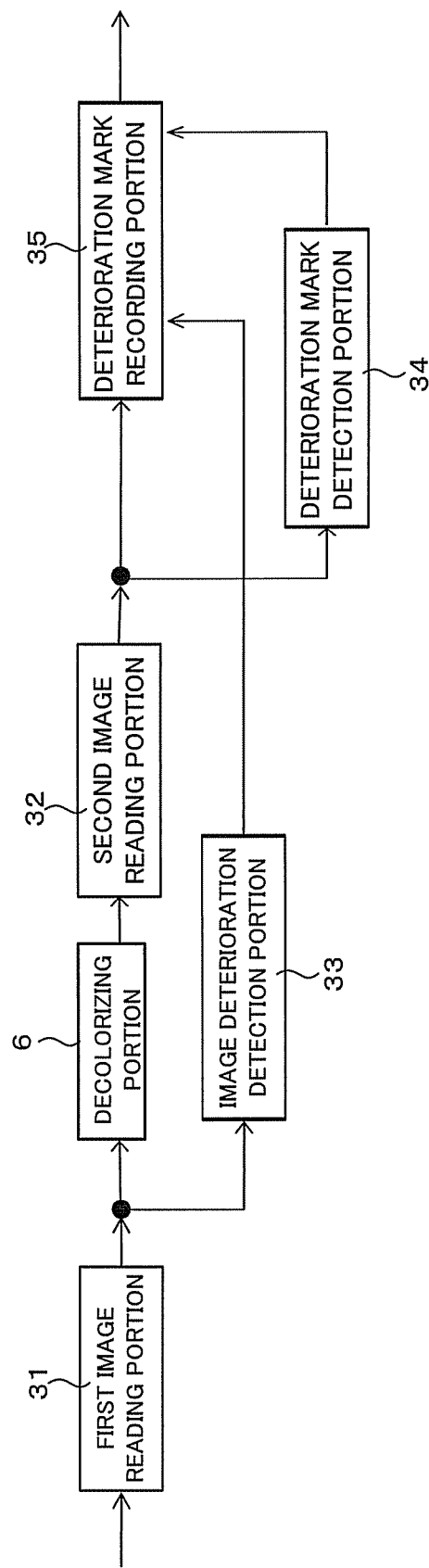
FIG. 3 is a block diagram illustrating a configuration example according to a first embodiment.
Figure 4:
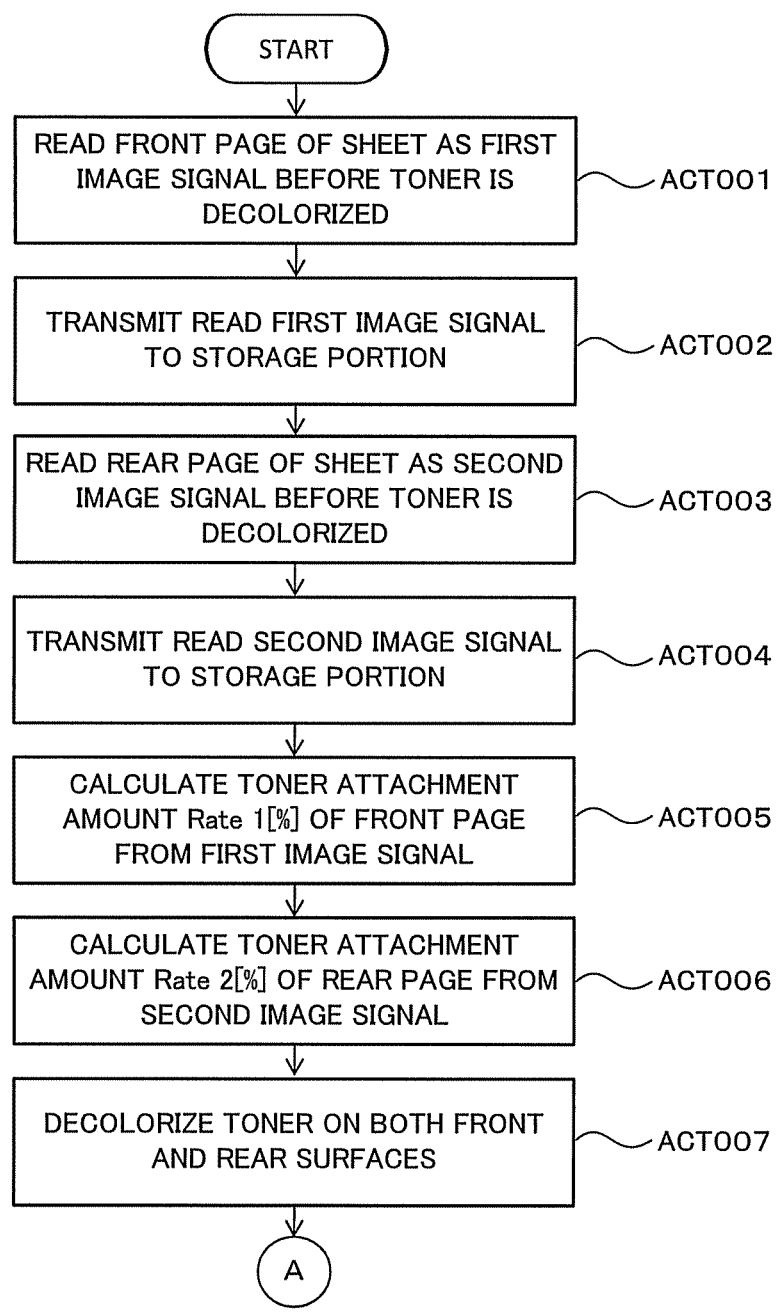
FIG. 4 is a flowchart illustrating an operation example (first).
Figure 5:
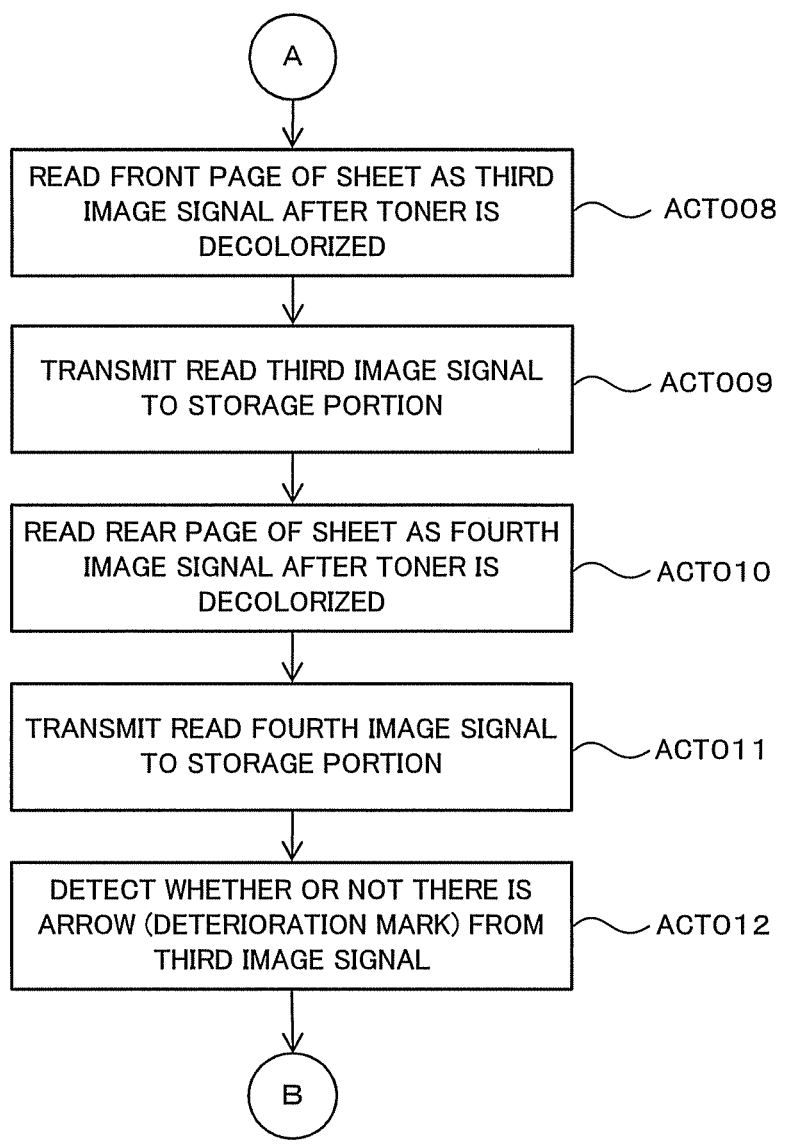
FIG. 5 is a flowchart illustrating an operation example (second).
Figure 6:
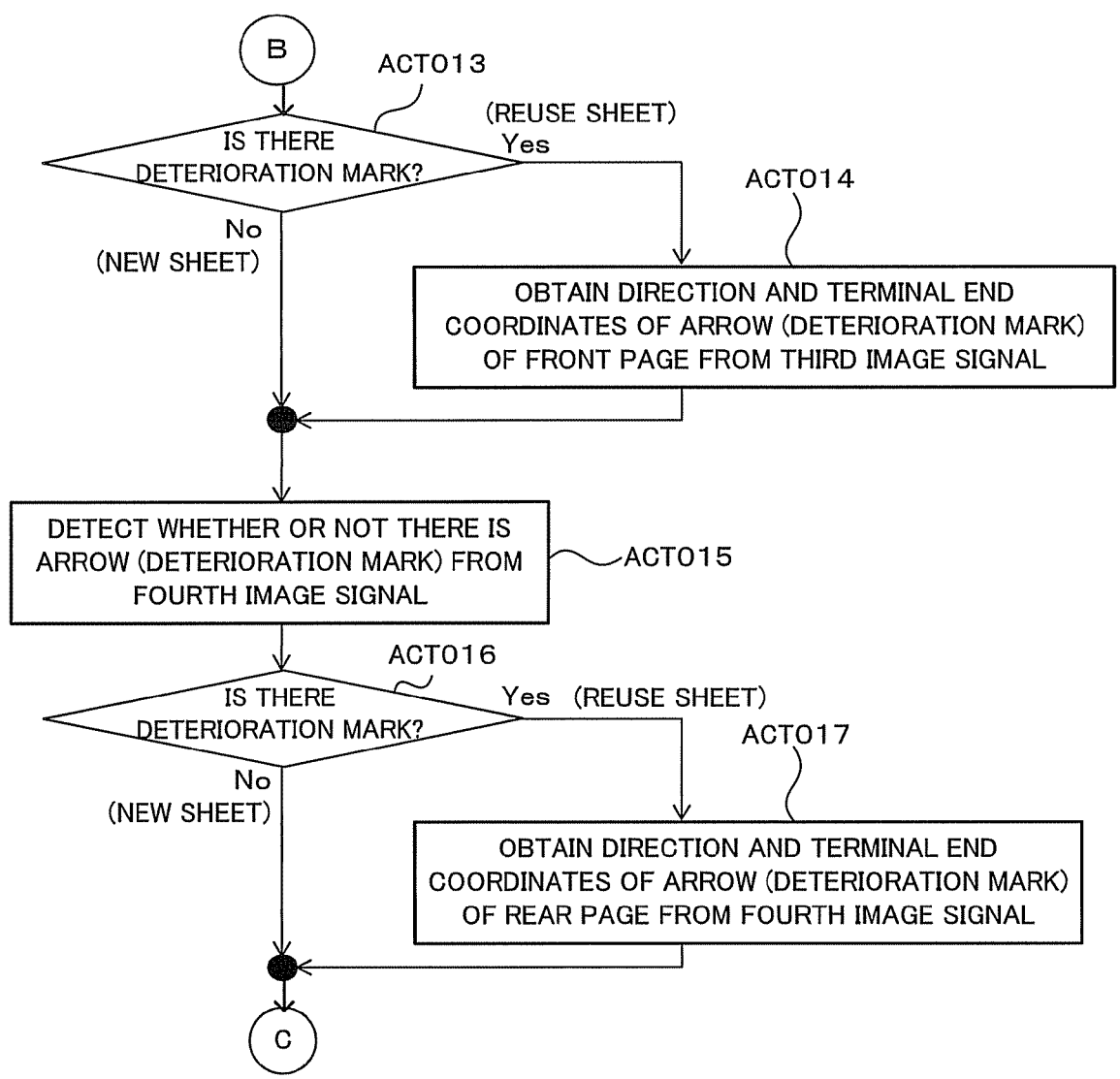
FIG. 6 is a flowchart illustrating an operation example (third).

An operation example according to the first embodiment will be described with reference to a block diagram of FIG. 3 and the flowcharts of FIGS. 4 to 7.

First, before an image is decolorized from a sheet, a first image reading portion 31 reads both surfaces of the sheet in order to preserve the content thereof. As a detailed example of the first image reading portion 31, CIS sensors (or CCD sensors) are disposed with the sheet interposed therebetween in a sheet carrying path. First, in ACT 001, the first image reading portion 31 reads the front page and inputs a first image signal, and, in ACT 002, the first image reading portion 31 transmits the first image signal to the storage portion 13.

Next, in ACT 003, the first image reading portion 31 reads an image of the rear page and inputs a second image signal, and, in ACT 004, the first image reading portion 31 transmits the second image signal to the storage portion 13.

Next, in ACT 005, an image deterioration detection portion 33 calculates a toner attachment amount of the front page from the first image signal. In addition, the image deterioration detection portion 33 is realized by a processor operating and executing a program.

First, the image deterioration detection portion 33 compares RGB signals of each pixel of the first image signal with luminance threshold values thR, thG, and thB, and extracts pixels satisfying the following expression as non-white pixels.

$$(R<thR) \text{ or } (G<thG) \text{ or } (B<thB)$$

Here, R, G, and B are RGB signal values of each pixel, and thR, thG, and thB are predefined luminance threshold values of RGB.

Next, the image deterioration detection portion 33 counts the number Nb of the extracted non-white pixels, and calculates a rate (Rate 1) with a total number Nt of pixels as a toner attachment amount.

$$\text{Rate } 1 = Nb/Nt \times 100 [\%]$$

In ACT 006, the image deterioration detection portion 33 performs the same process for the second image signal, and calculates a toner attachment amount Rate 2 of the rear page.

Next, in ACT 007, the decolorizing portion 6 decolorizes toner on the sheet. The decolorizing portion 6 includes, for example, two heating rollers, the two rollers are disposed, and the sheet passes between the rollers, thereby decolorizing toner on both surfaces of the sheet.

Next, a second image reading portion 32 reads both surfaces of the sheet medium after the decolorizing. The second image reading portion 32 has a configuration in which CIS sensors (or CCD sensors) are disposed with a sheet interposed therebetween in the sheet carrying path in the same manner as the first image reading portion 31. In the same manner as the first image reading portion 31, in ACT 008 and ACT 009, the second image reading portion 32 reads the front page of the sheet after the decolorizing, and inputs a third image signal which is transmitted to the storage portion 13. In addition, in ACT 010 and ACT 011, the second image reading portion 32 reads the rear page of the sheet after the decolorizing, and inputs a fourth image signal which is transmitted to the storage portion 13. Further, the second image reading portion 32 and the first image reading portion 31 may use the same sensor or may use different sensors. Specifically, as shown in FIG. 8A, the first image reading portion 31, the decolorizing portion 6, and the second image reading portion 32 may be disposed linearly, and the first image reading portion 31 and the second image reading portion 32 may use different sensors. Alternatively, as shown in FIG. 8B, a sheet carrying path is designed such that a sheet returns to an input side of the first image reading portion 31 after the sheet is forwarded to the first image reading portion 31 and the decolorizing portion 6, and the first image reading portion 31 and the second image reading portion 32 may use the same sensor.

Next, in ACT 012, a deterioration mark detection portion 34 (realized by the processor 8 operating and executing a program) detects an existing sheet deterioration mark from the third image signal. A detailed detection method will be described below.

First, RGB signals of each pixel on the left and right sheet end regions of the third image signal are compared with luminance threshold values thR, thG, and thB, and pixels satisfying the following expression are extracted as non-white pixels.

$$(R<thR) \text{ or } (G<thG) \text{ or } (B<thB)$$

Here, R, G, and B are RGB signal values of each pixel, and thR, thG, and thB are predefined luminance threshold values of RGB.

Here, the reason why the non-white pixels are extracted only from the sheet end region is that an arrow is printed at the sheet right end, and, the reason why the non-white pixels are extracted from both the left and right ends is that since there are a lot of chances that a sheet is inserted upside down, and this is considered.

Figure 9:
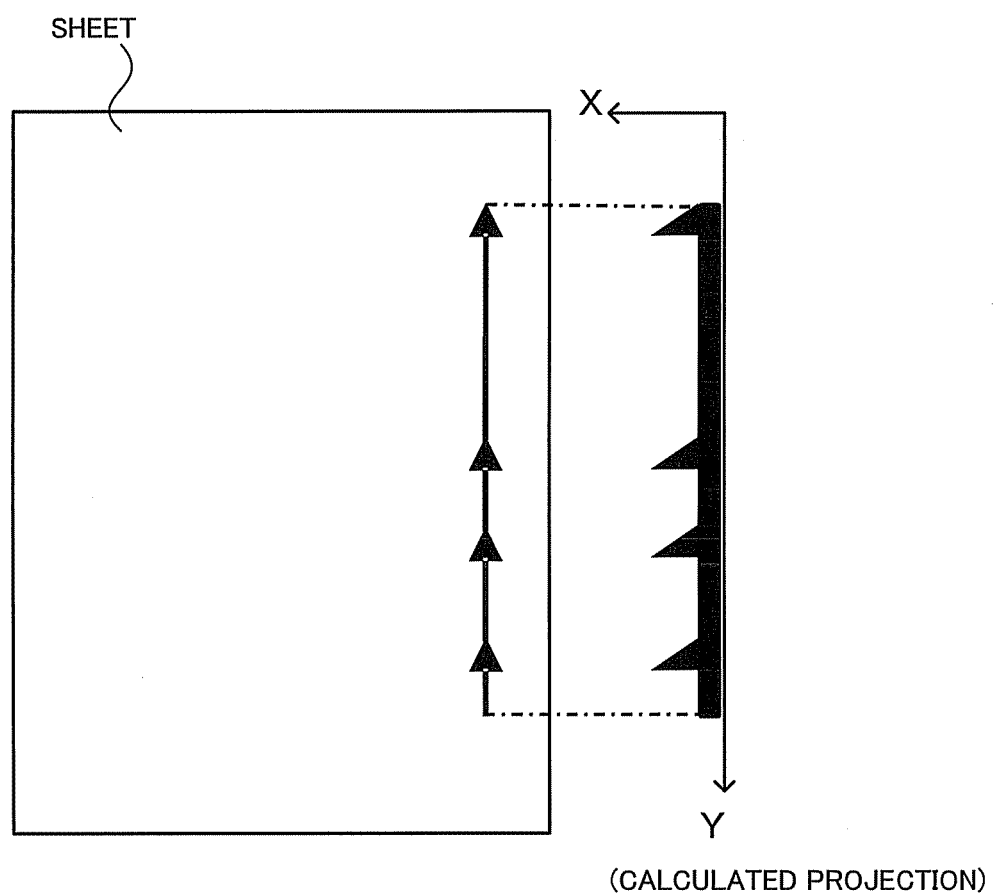
FIG. 9 is a diagram illustrating an example of the projection of a mark.

Next, a projection of the non-white pixels is taken in the main scanning direction in both the left and right end regions (specifically, the number of the non-white pixels is counted in the main scanning direction in each sub-scanning line). FIG. 9 shows a relationship between an arrow under being printed and a projection. As shown in FIG. 9, there are only the non-white pixels at a place where a value of the projection is 0 in the X direction. A place having a small positive value in the X direction indicates that there is an arrow. In addition, since the peak indicates an arrow head, the number and positions of the peaks are obtained, and thereby it is possible to specify the number and positions of the arrows. Further, a position of the peak located at the upper end of the arrow indicates that the sheet is inserted in a forward direction, and the arrow looks upward. Conversely, a position of the peak located at the lower end of the arrow indicates that the sheet is inserted in a reverse direction, and the arrow looks downward. In addition, if all the values in the X direction of the projection are 0, this indicates that there is no arrow, and if an arrow is not detected in any of the left and right regions, the sheet can be regarded as a new sheet.

Through the above-described method, the deterioration mark detection portion 34 determines whether or not there is a deterioration mark in ACT 013, and detects a direction of the arrow which is the existing deterioration mark and terminal end coordinates (x0, y0) thereof in ACT 014, in order to print a deterioration mark in the subsequent process if there is the deterioration mark (ACT 103, Yes). In the same manner, a deterioration mark is also detected from the fourth image signal, and a direction of the arrow which is the existing deterioration mark and terminal end coordinates thereof are detected (ACT 015 to ACT 017).

Finally, a deterioration mark recording portion 35 additionally records a sheet deterioration mark. As a detailed implementation example of the deterioration mark recording portion 35, a thermal ink jet (the mark printing portion 9A in FIG. 1) which is generally widely used as an option of a document scanner (the scanner sensor 9 in FIG. 1) may be used. The thermal ink jet is disposed with the sheet interposed therebetween on both sides of the sheet carrying path as shown in FIGS. 8A and 8B, and thereby it is possible to perform printing on both surfaces of the sheet. First, in relation to the front page, a length of the arrow is calculated from the toner attachment amount Rate 1[%] obtained by the image deterioration detection portion 33. Here, the length (the number of pixels) L of the arrow is simply calculated through multiplication with a predefined number len of pixels of about 1%.

$$L = \text{Rate } 1 \times \text{len [pixels]}$$

If there is the deterioration mark on the front page in ACT 108, the deterioration mark recording portion 35 sets a position for addition, from positional information of the existing deterioration mark obtained by the deterioration mark detection portion 34 and performs printing in ACT 109. For example, if the terminal end of the deterioration mark is (x0, y0) and the deterioration mark is an upward arrow, the deterioration mark recording portion 35 prints a line segment between (x0, y0) and (x0, y0−L), and further prints an arrow head part by filling inside of a triangle having (x0, y0−L), (x0−α, y0−L+α), and (x0+α, y0−L+α) as vertices (where α is a predefined length). On the contrary, if the deterioration mark is a downward arrow, the deterioration mark recording portion 35 prints a line segment between (x0, y0) and (x0, y0+L), and further prints an added arrow by filling inside of a triangle having (x0, y0+L), (x0−α, y0+L−α), and (x0+α, y0+L−α) as vertices. In addition, the printing here is performed using an undecolorable toner. The same process is performed for the rear page, and thereby a deterioration mark can be additionally printed (Yes in ACT 021, and ACT 022).

In addition, if an arrow is not detected by the deterioration mark detection portion 34 in ACT 018 (that is, if there is no history that printing is performed on the corresponding page), an upward arrow of the length L having a predefined position (here, (x0, y0)) as a start point is printed in ACT 020. Further, the maximum value Rmax [%] of an accumulated toner attachment amount which can resist against reuse is obtained in advance, and, for example, a line segment is drawn between (x0−β, y0−Rmax×len) and (x0+β, y0−Rmax×len), thereby displaying a sheet reuse limit to a user so as to be easily understood (refer to FIG. 2).

The same process is performed for the rear surface of the sheet, and thereby it is possible to indicate a sheet deterioration extent of both the front and rear surfaces (No in ACT 021, and ACT 023).

Figure 10:
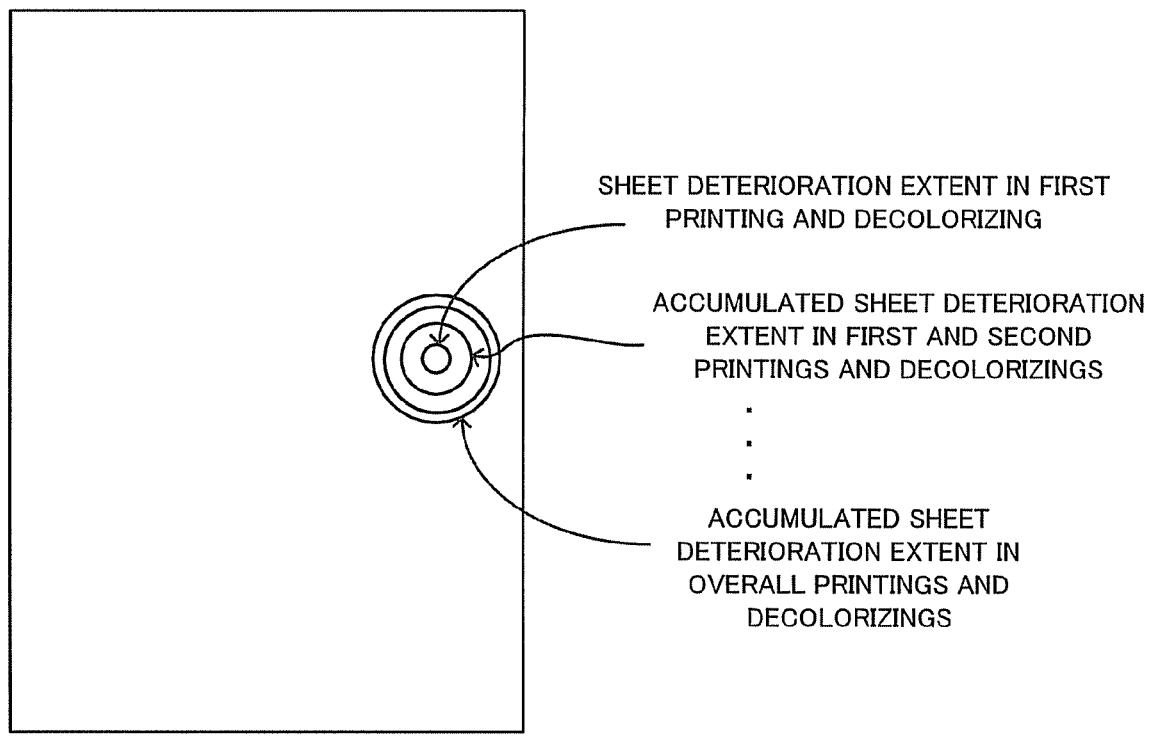
FIG. 10 is a diagram illustrating an example of the case where a shape of the deterioration mark (predetermined mark) is a circular shape.

In addition, hitherto, a description has been made of an example where an arrow is used as a mark indicating a sheet deterioration extent, and the sheet deterioration extent is indicated by the number and length of the arrows. As another example, for example, as shown in FIG. 10, a concentric circle may be used as a mark. In other words, if an accumulated amount of a sheet deterioration extent is indicated by a radius, the number of circumferences indicates the number of printings, and a radius of the outermost circumference indicates an accumulated amount of a deterioration extent.

The deterioration mark recording portion 35 forms a circular mark such that a radius of the circular mark recorded this time has a length obtained by adding a length according to a toner attachment amount to the outermost radial length of the existing circular mark. In addition, the deterioration mark recording portion 35 forms a new circular mark so as to become a concentric circle (the center thereof conforms to the existing circular mark).

Figure 11:
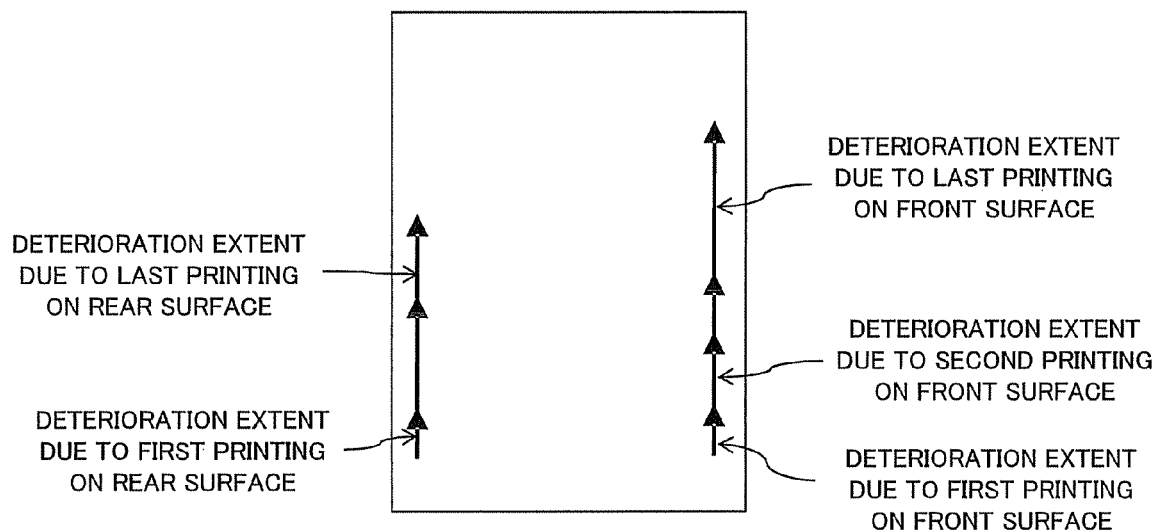
FIG. 11 is a diagram illustrating an example of the case where a deterioration mark of a front surface and a rear surface is formed on one surface.

In addition, hitherto, a description has been made of an example where a mark indicating a sheet deterioration extent is recorded on both the front and rear surfaces, that is, an example where a deterioration extent of the front surface is marked on the front surface, and a deterioration extent of the rear surface is marked on the rear surface. However, as shown in FIG. 11, if a deterioration mark is printed on only one surface, and a user is requested to dispose the sheet in the reuse sheet supply cassette 10 such that the surface on which the deterioration mark is recorded is located in a set direction (for example, upward), a process is simply performed for one surface of the sheet, and thereby it is possible to manage a deterioration extent of both surfaces of the sheet.

Figure 12:
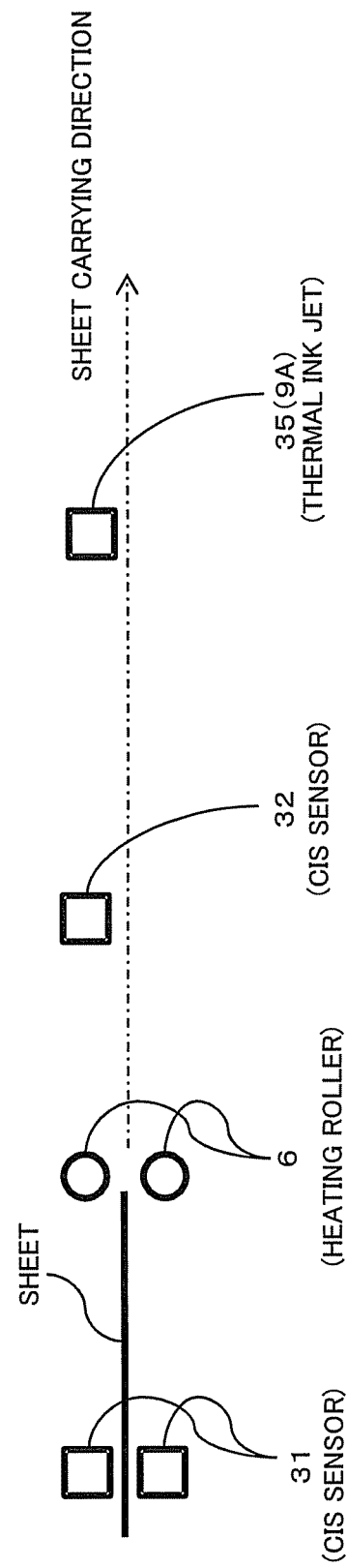
FIG. 12 is a block diagram when the deterioration mark is a punched hole.

Specifically, the deterioration mark recording portion 35 sets a lower end of a sheet as a start point of a deterioration mark, and additionally records an upward arrow. The right end of the sheet is set as a region indicating sheet deterioration of the front surface, and the left end of the sheet is set as a region indicating sheet deterioration of the rear surface. If an upward arrow is detected, since the sheet can be determined as being set in a forward direction, the deterioration mark detection portion 34 detects the arrow in the sheet right end region, and the deterioration mark recording portion 35 additionally records an upward arrow with a length indicating a sheet deterioration extent of the front surface in the upper direction of the existing mark. In addition, the deterioration mark detection portion 34 detects an arrow in the sheet left end region, and the deterioration mark recording portion 35 additionally records an upward arrow with a length indicating a sheet deterioration extent of the rear surface in the upper direction of the existing mark. On the contrary, if the deterioration mark detection portion 34 detects a downward arrow, since the sheet can be determined as being set to be upside down, the deterioration mark detection portion 34 detects the arrow in the sheet left end region, and the deterioration mark recording portion 35 additionally records a downward arrow with a length indicating a sheet deterioration extent of the front surface in the lower direction of the existing mark. In addition, the deterioration mark detection portion 34 detects an arrow in the sheet right end region, and the deterioration mark recording portion 35 additionally records a downward arrow with a length indicating a sheet deterioration extent of the rear surface in the lower direction of the existing mark. In this way, as shown in FIG. 12, the second image reading portion 32 and the deterioration mark recording portion 35 (the mark printing portion 9A) can be disposed not on both sides of the sheet but on one side of the sheet, and it is possible to manage a sheet deterioration extent of both the front and rear surfaces.

Figure 13:
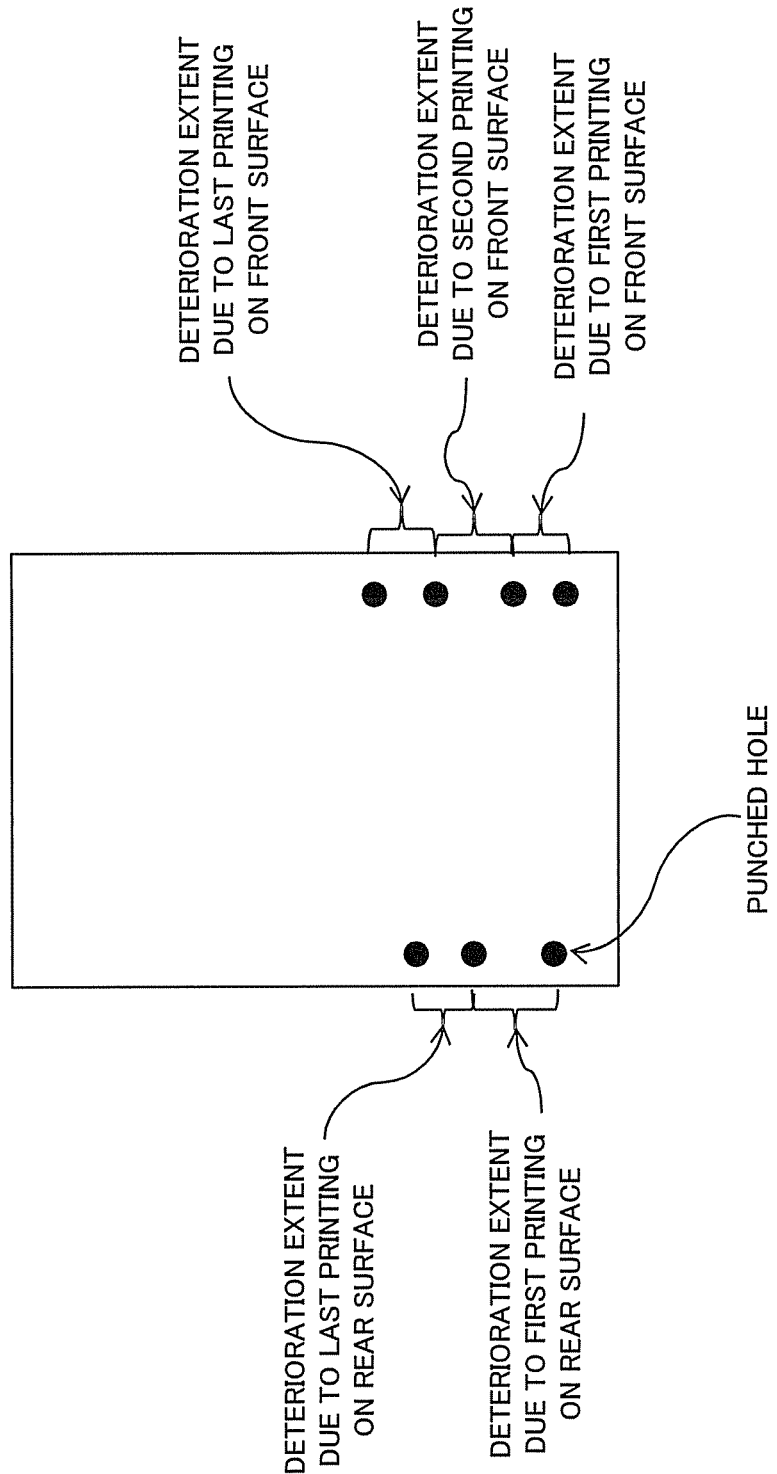
FIG. 13 is a diagram illustrating an example of forming a mark when the deterioration mark is a punched hole.

In addition, a deterioration mark is not printed on a sheet but a hole may be punched. For example, as shown in FIG. 13, a lower end of the sheet is a start point, a hole (punched hole) indicating sheet deterioration of the corresponding surface is punched on the right side of the sheet, and a hole indicating sheet deterioration of the opposite surface is punched on the left side of the sheet. Instead of the length of the arrow described above, an interval between the holes indicates a sheet deterioration extent. Here, if a hole detected by the deterioration mark detection portion 34 has a sheet upper end as a start point, since it can be determined that the sheet is supplied to be upside down, the left hole can be regarded as a mark indicating deterioration of the sheet front surface, and the right hole can be regarded as a mark indicating deterioration of the sheet rear surface. Further, if a region in which a hole is formed is set, even in a case where attention is paid to any surface of the sheet, a hole indicating sheet deterioration of the attention surface is located at the sheet right end, and a hole indicating sheet deterioration of the rear surface is located at the sheet left end, at all times. As described above, by using a hole, a user need not be aware of front and rear surfaces of a sheet when setting the sheet in the reuse sheet supply cassette 10. Further, the second image reading portion 32 and the deterioration mark recording portion 35 are disposed on only one side of a sheet, and thereby it is possible to manage a sheet deterioration extent of both the front and rear surfaces of the sheet (a disposition example is the same as that shown in FIG. 12). In addition, the deterioration mark recording portion 35 in this case is a hole punch unit.

In addition, printing of a mark or punching of a hole indicating sheet deterioration is preferably performed in the carrying direction of a sheet. In this way, the deterioration mark recording portion 35 or a hole punch unit can be fixed and installed (not shown) in the recording medium reproducing apparatus 100, and thus a mechanism for moving the deterioration mark recording portion 35 or the hole punch unit.

With the above-described configuration, a mark indicating a sheet deterioration extent can be recorded on a sheet, and thus a user can determine a sheet deterioration extent without using a particular instrument.

Second Embodiment

Figure 14:
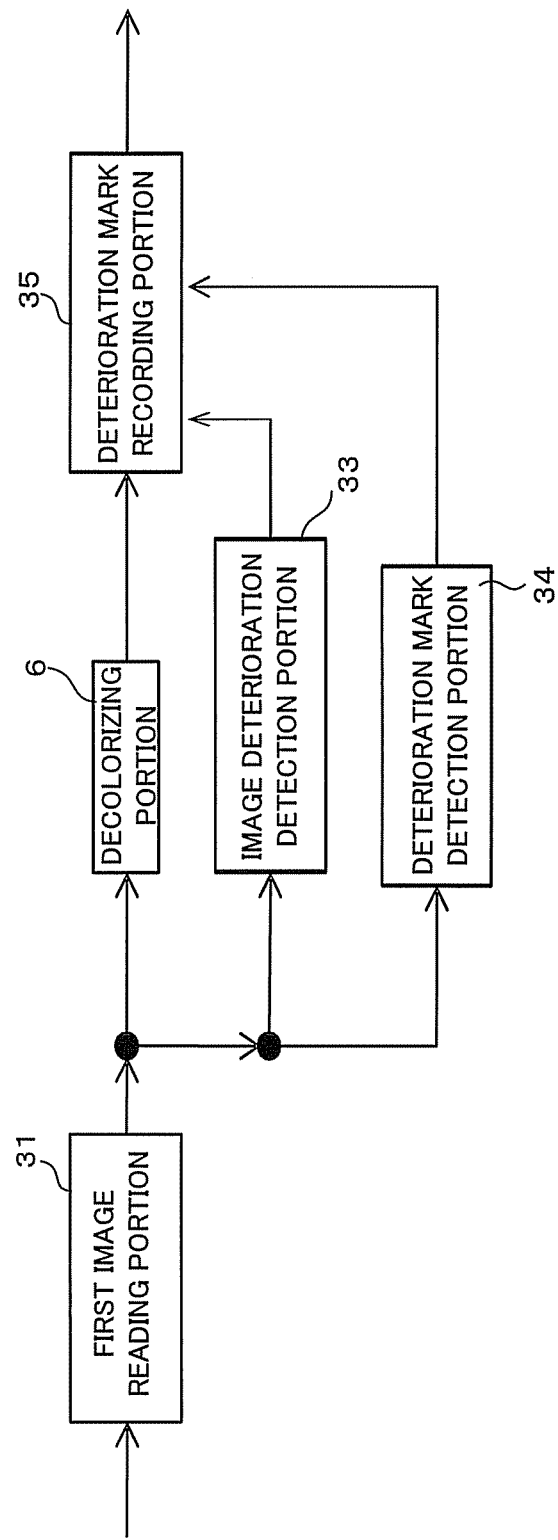
FIG. 14 is a block diagram illustrating a configuration example according to a second embodiment.
Figure 15:
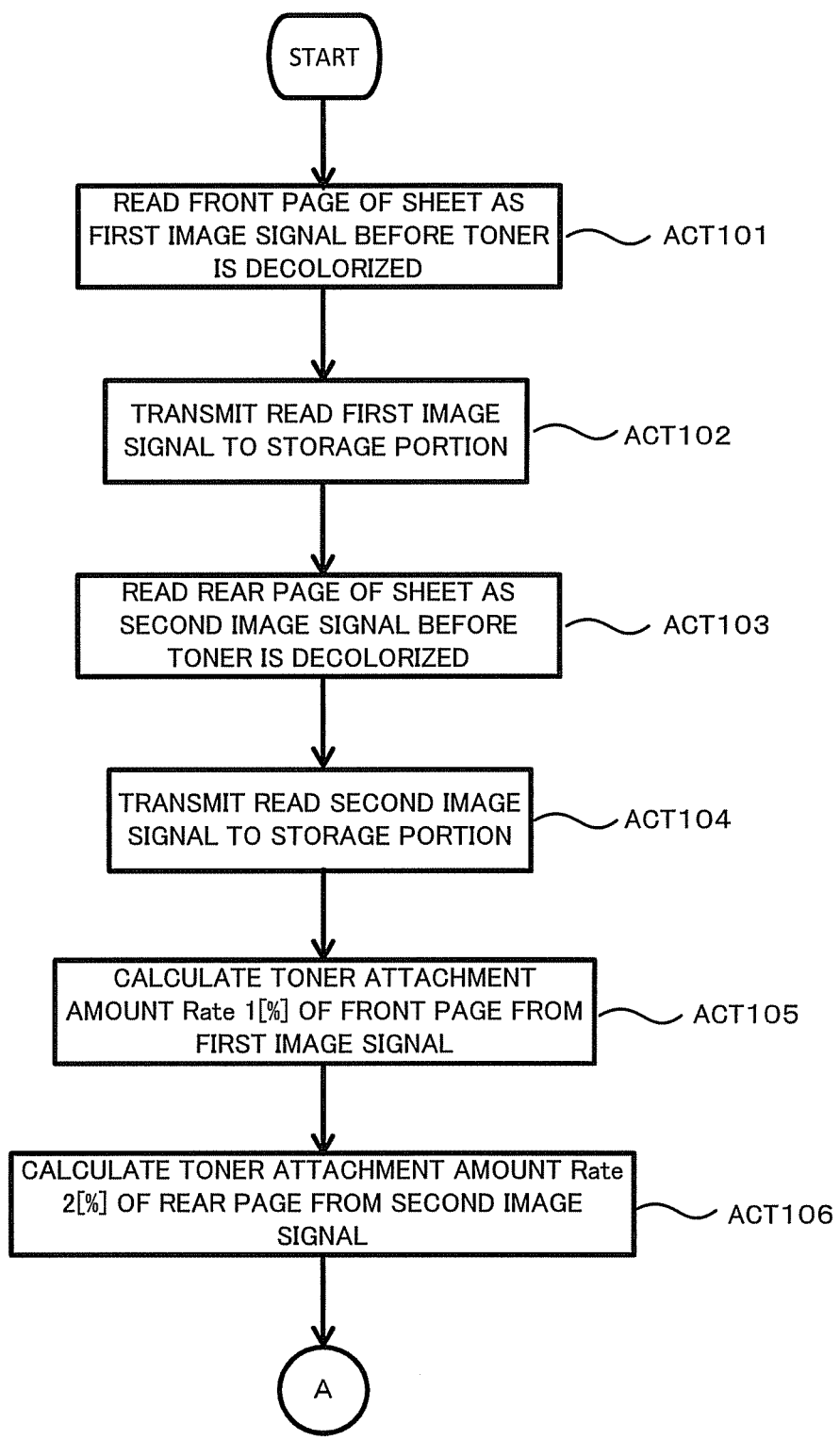
FIG. 15 is a flowchart illustrating an operation example (first).
Figure 16:
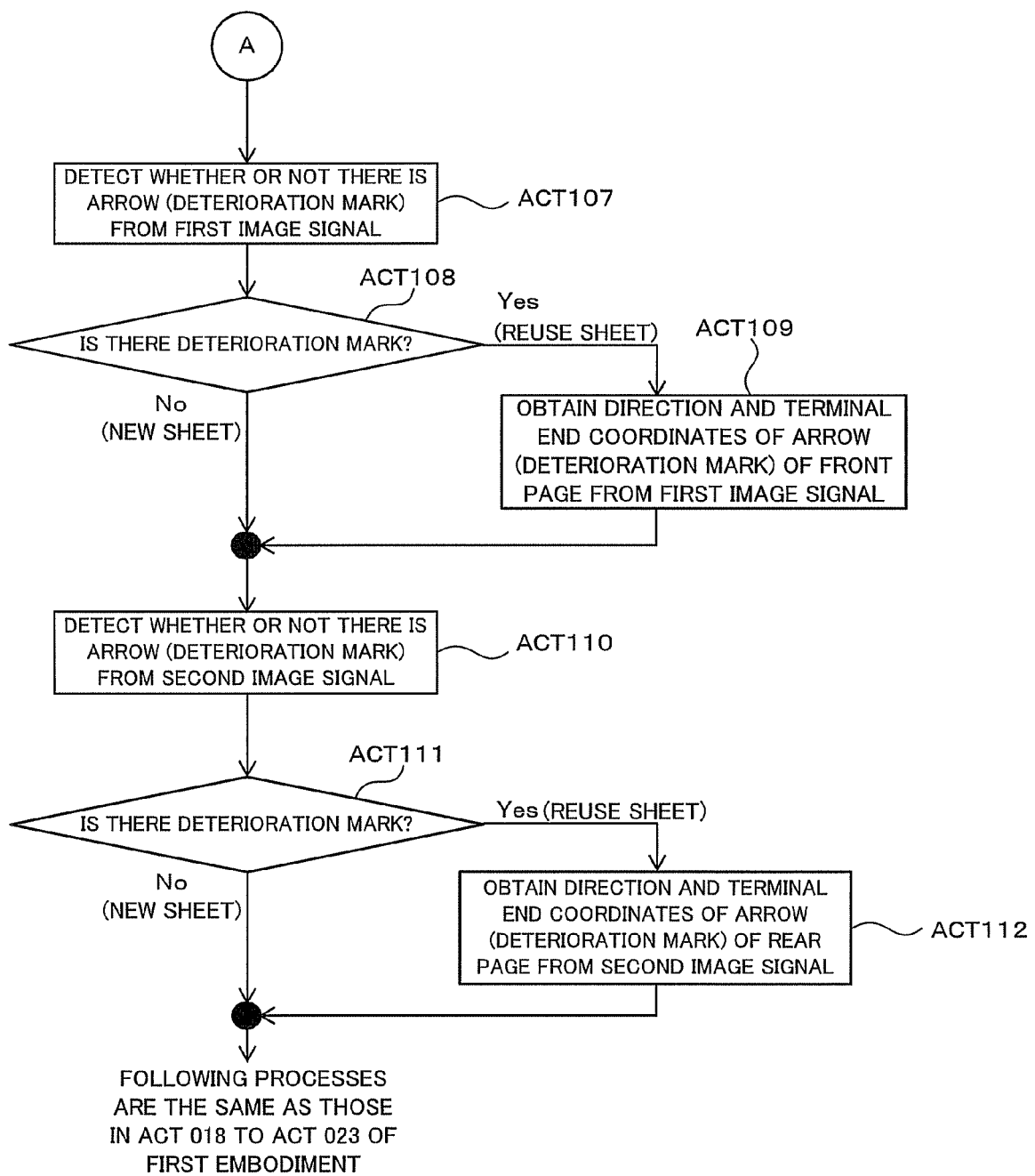
FIG. 16 is a flowchart illustrating an operation example (second).

An implementation example according to the second embodiment will be described with reference to the block diagram of FIG. 14 and the flowcharts of FIGS. 15 and 16. A great difference between the second embodiment and the first embodiment is that a deterioration mark is also detected using the first image signal for detecting a sheet deterioration extent. Due to this difference, in the second embodiment, the second image reading portion 32 for reading a deterioration mark is not provided, and the deterioration mark detection portion 34 is configured to be parallel (may be disposed before the decolorizing portion 6) to the decolorizing portion 6.

As a first aspect of the second embodiment, a description will be made of an implementation example where a color of a decolorable toner is different from a color of a deterioration mark. Specifically, it is assumed that the decolorable toner is printed in blue, and the deterioration mark is printed in black.

First, in the same manner as the first embodiment, in ACT 101 to ACT 104, the first image reading portion 31 reads both the front and rear surfaces of the sheet, and inputs the first image signal and the second image signal which are transmitted to the storage portion 13.

Next, in ACT 105, the image deterioration detection portion 33 calculates a toner attachment amount of the front surface from the first image signal. Here, the decolorable toner is blue, and, pixels satisfying the following all expressions are extracted as blue pixels.

$B-R>thBR$ $B-G>thBG$ $R<thR$ $G<thG$

Here, R, G and B are RGB values of a pixel, and thBR and thBG are sufficiently large values which are set in advance. In addition, thR and thG are predefined positive values close to 0.

Next, the number Nb of the extracted blue pixels is counted, and a rate (Rate 1) with a total number Nt of pixels as a toner attachment amount.

Rate $1=Nb/Nt\times100[\%]$

In the same manner, in ACT 106, the image deterioration detection portion 33 calculates a toner attachment amount Rate 2[%] of the rear surface from the second image signal.

Next, in ACT 107, the deterioration mark detection portion 34 detects a deterioration mark recorded on the front surface from the first image signal. Here, the deterioration mark is recorded in black, and, for example, pixels satisfying the following all expressions are extracted as black pixels.

$R+G+B<thRGB$ $|R-G|<thRG$ $|G-B|<thGB$ $|B-R|<thBR$

Here, R, G and B are RGB values of a pixel. "|" is a symbol indicating an absolute value. In addition, thRGB, thRG, thGB, and thBR are sufficiently small values set in advance.

In ACT 108, it is determined whether or not there is a deterioration mark, and, if there is the deterioration mark, in ACT 109, a direction of the existing deterioration mark and terminal end coordinates thereof on the front surface are detected in the same manner as the deterioration mark detection portion 34 of the first embodiment. In addition, in relation to the rear surface of the sheet, the deterioration mark detection process is performed for the second image signal, and thereby a direction of the existing deterioration mark and terminal end coordinates thereof can be detected (ACT 110 to ACT 112).

Figure 7:
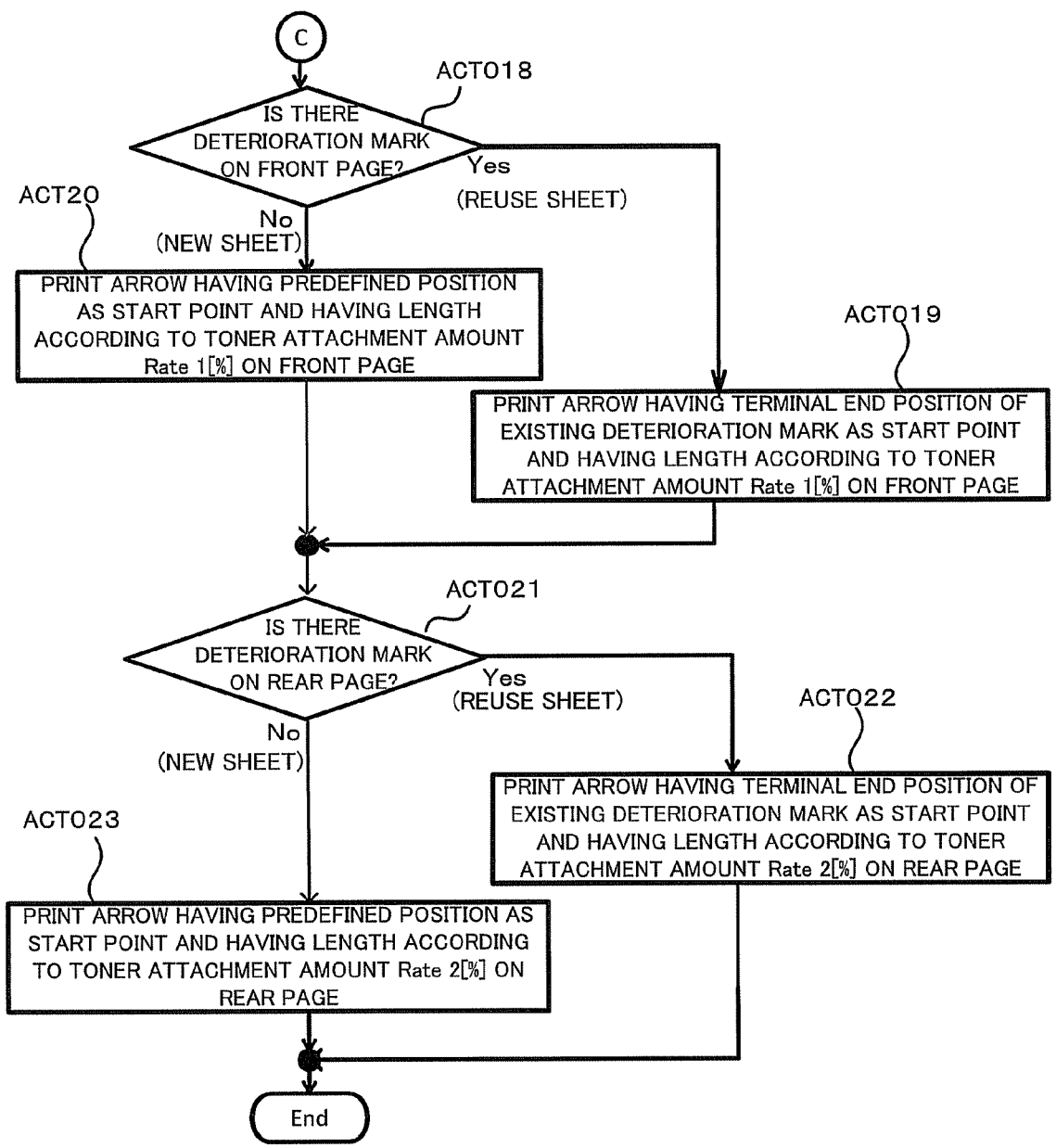
FIG. 7 is a flowchart illustrating an operation example (fourth).

The processes if ACT 111 is No or after ACT 112 are performed by the decolorizing portion 6 and the deterioration mark recording portion 35 but are the same as the processes in ACT 018 to ACT 023 of the first embodiment, and thus description thereof will be omitted (refer to FIG. 7).

As described above, it is possible to record a mark indicating accumulated sheet deterioration on a sheet without reading an image after sheet decolorizing.

Next, as a second aspect of the second embodiment, a description will be made of an example where outside (a sheet end) of a region where an original document is printed is set as a specific region, and a deterioration mark is recorded at the position.

First, in the same manner as the first embodiment, the first image reading portion 31 reads both the front and rear surfaces of the sheet, and inputs the first image signal and the second image signal.

Next, in the same manner as the first embodiment, the image deterioration detection portion 33 calculates a toner attachment amount Rate 1[%] of the front surface from the first image signal, and calculates a toner attachment amount Rate 2[%] of the rear surface from the second image signal.

Next, the deterioration mark detection portion 34 detects a direction of the existing deterioration mark and terminal end coordinates thereof. The deterioration mark detection portion 34 first compares RGB signals of each pixel of the first image signal with luminance threshold values thR, thG, and thB, and extracts a binary image in which pixels satisfying the following expression are black pixels, and pixels not satisfying the following expression are white pixels.

$(R<thR)$ or $(G<thG)$ or $(B<thB)$

Here, R, G, and B are RGB signal values of each pixel, and thR, thG, and thB are predefined luminance threshold values of RGB.

Figure 17A:
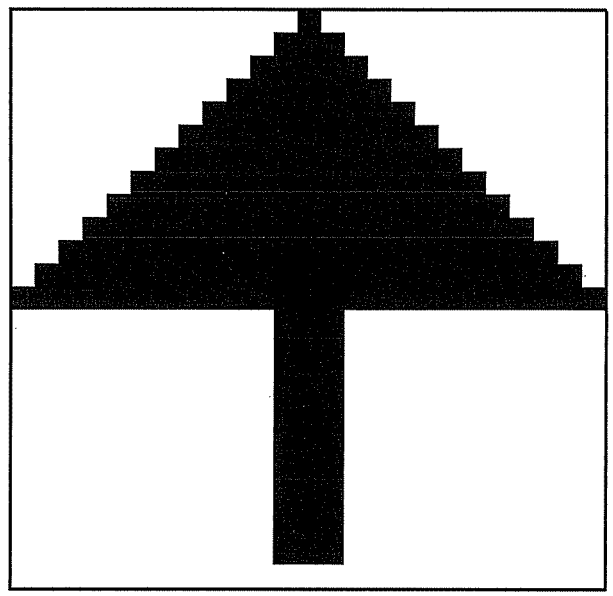
FIG. 17A is a diagram illustrating an example of a pattern image of an arrow head (upward arrow).

Next, the deterioration mark detection portion 34 detects a deterioration mark from the region (the above-described specific region) which is set in advance as a region in which a deterioration mark is recorded. In the second aspect, a template image of an arrow head shown in FIG. 17A is prepared in advance, and is stored in the storage portion 13. The deterioration mark detection portion 34 performs matching by shifting the template image by one pixel in the specific region in which the deterioration mark of the extracted binary image is recorded. Specifically, when a pixel of the binary image is set to Pb, and a pixel of the template image is set to Pt, the deterioration mark detection portion 34 calculates the following expression.

$\Sigma!EXOR(Pb,Pt)$

Here, the white pixel is indicated by 0, and the black pixel is indicated by 1. In addition, "!" indicates negation, and EXOR is a logical expression indicating Exclusive OR.

Figure 17B:
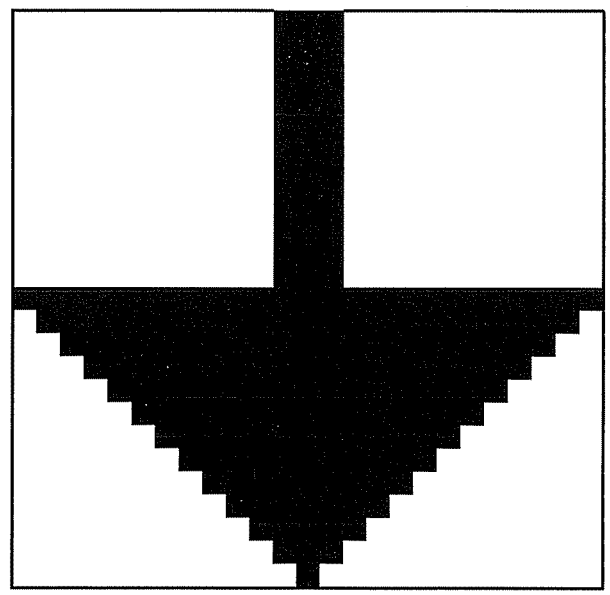
FIG. 17B is a diagram illustrating an example of the pattern image of an arrow head (downward arrow).

The deterioration mark detection portion 34 acquires distribution of values of the matching for each template position and thereby can specify a position of a peak thereof as a position of the arrow head. In addition, a matching result of the upward arrow head shown in FIG. 17A is acquired, and, presence of a peak can be regarded as presence of an upward arrow, thereby specifying a direction of the arrow. Further, of previously specified positions of the arrow head, coordinates of the arrow head disposed on the uppermost side can be specified as terminal end coordinates of the existing deterioration mark. Naturally, if a sheet is set to be upside down in the cassette, an upward arrow is not detected. At this time, a template image of a downward arrow shown in FIG. 17B is prepared, and a position of the arrow head is specified in the same procedure. In this case, the terminal end coordinates are a position of the arrow head disposed on the lowermost side.

Figure 18:
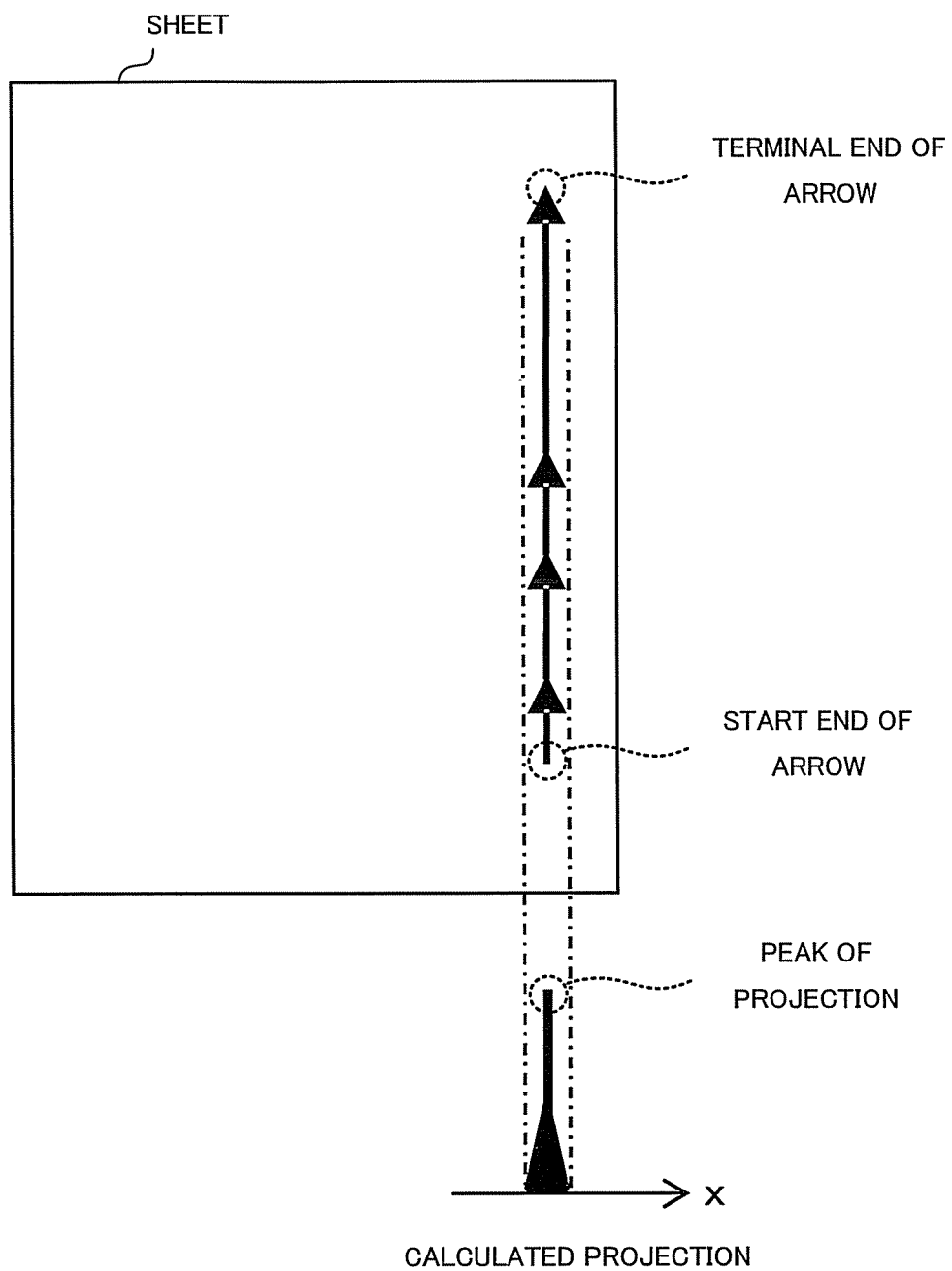
FIG. 18 is a diagram illustrating an example of the projection of the deterioration mark.
Figure 19:
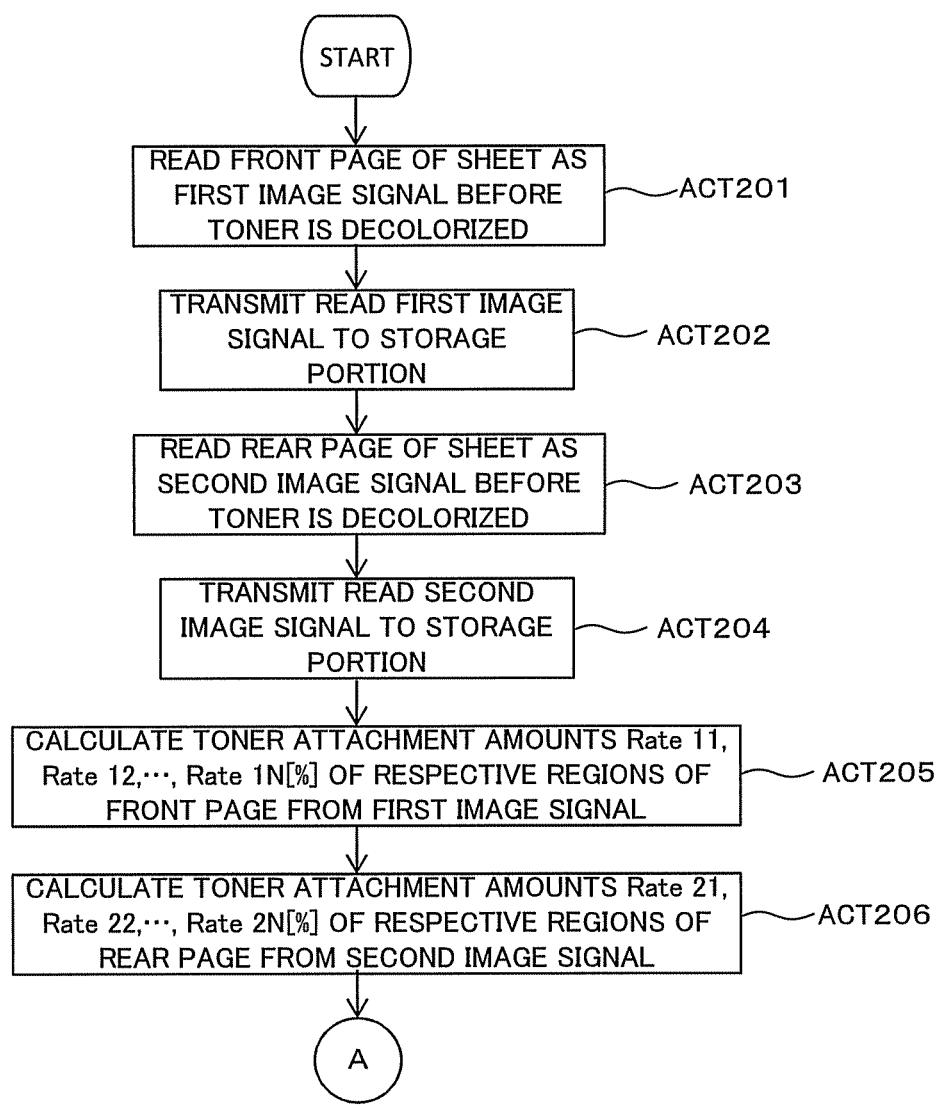
FIG. 19 is a flowchart illustrating an operation example according to a third embodiment (first).
Figure 20:
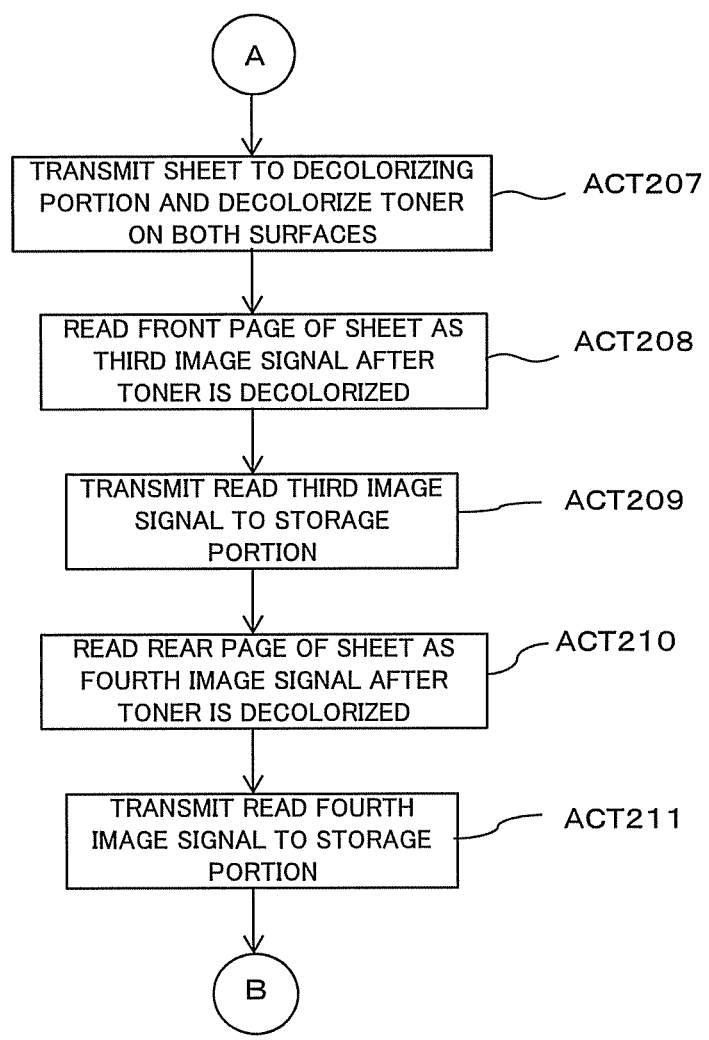
FIG. 20 is a flowchart illustrating an operation example (second).
Figure 21:
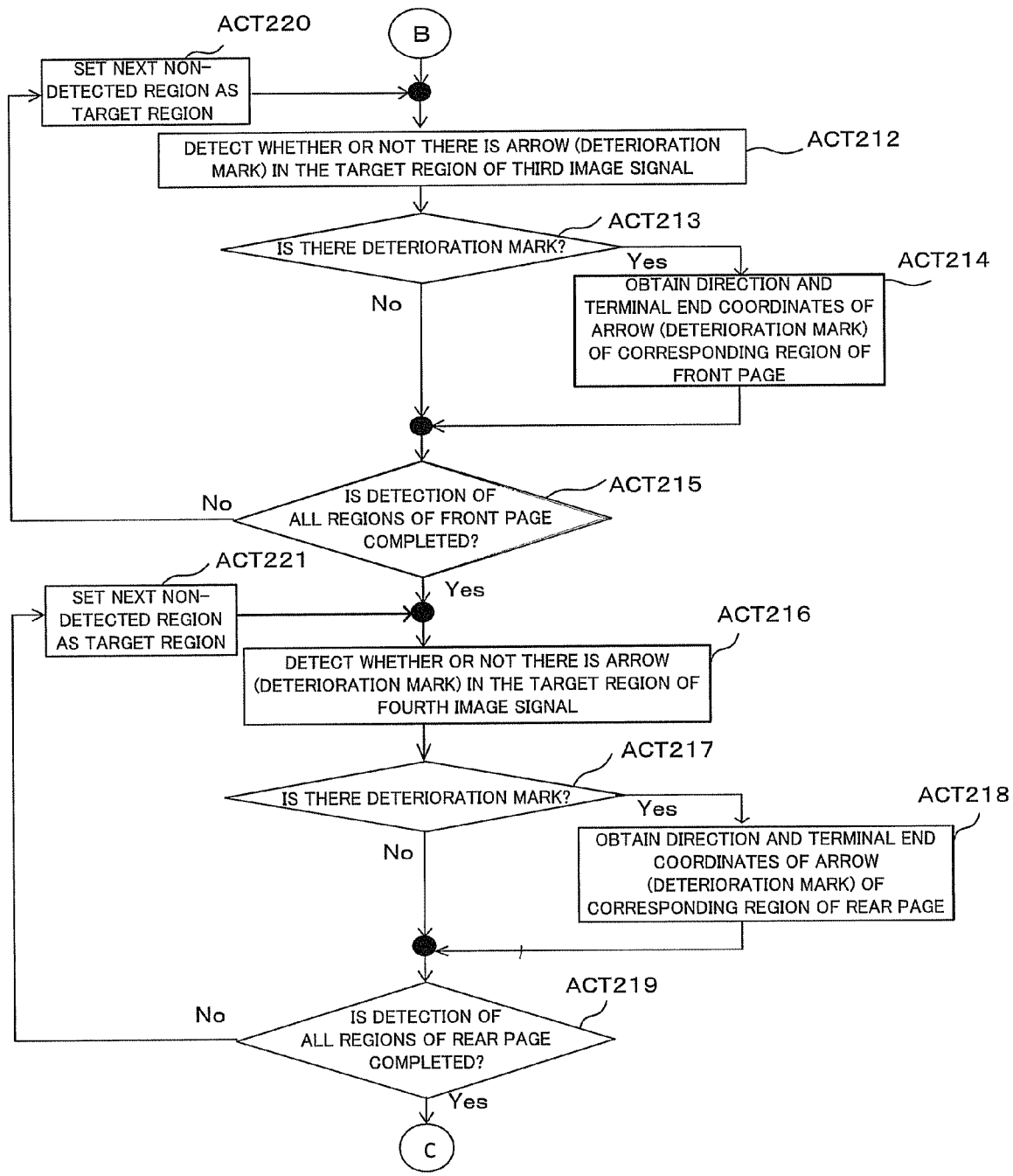
FIG. 21 is a flowchart illustrating an operation example (third).
Figure 22:
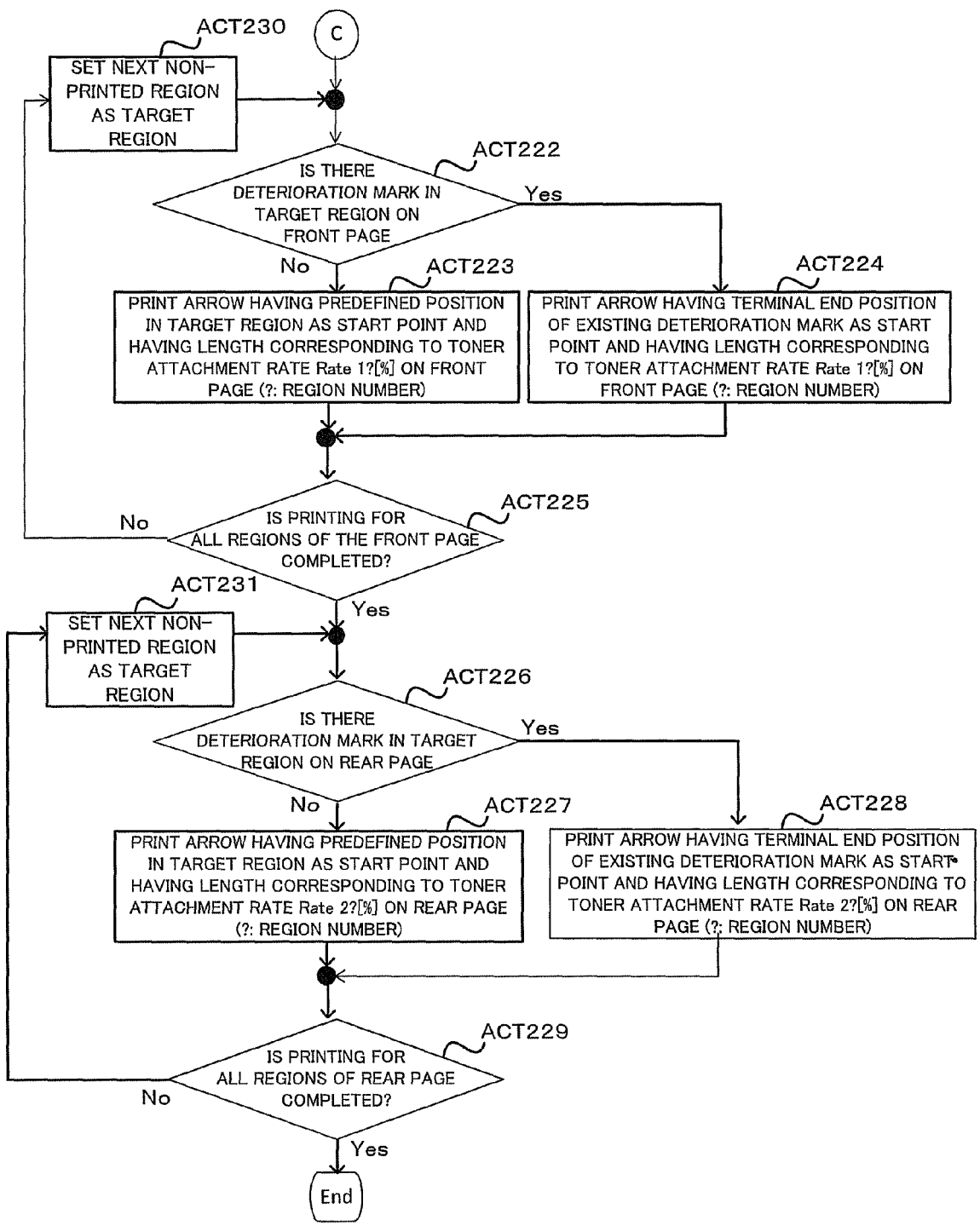
FIG. 22 is a flowchart illustrating an operation example (fourth).

In addition, since coordinates of the start point of the deterioration mark cannot be known in this state, in the present aspect, as shown in FIG. 18, projection is taken in a direction along the direction of the arrow in the specific region. Here, a value of a peak of the projection is the same as a sum total of lengths of the arrows, and thus start point coordinates can be calculated from a sum total of terminal end coordinates and the lengths of the arrows.

An operation of the decolorizing portion 6 and the deterioration mark recording portion 35 thereafter is the same as the operation in the first embodiment, and thus description thereof will be omitted.

In addition, the deterioration mark detection portion 34 of the second aspect of the second embodiment employs template matching of which calculation costs are higher than in the first embodiment. This is because the end part of the sheet in which printing of an original document is not easy is set as a recording region of a deterioration mark, but, unlike in the first embodiment, the decolorable toner is not decolorized yet, and thereby, in many cases, a printing part of the original document is mixed with the end part region. In this case, since a deterioration mark cannot be detected only by taking projection as described in the first embodiment, detection is performed through the template matching. Naturally, template matching may be performed in the first embodiment as well, and may be performed in the first aspect of the second embodiment as well.

With the above-described configuration, a mark indicating a deterioration extent of a sheet can be recorded on the sheet without scanning the sheet after decolorizing, and a user can determine a deterioration extent of the sheet without using a particular instrument.

Third Embodiment

An operation example according to the third embodiment will be described with reference to the flowcharts of FIGS. 19 to 22. In addition, a block diagram is the same as that of the first embodiment (refer to FIG. 3). In the third embodiment, a sheet deterioration mark does not indicate sheet deterioration of the entire sheet but indicates sheet deterioration for each region when the sheet is divided into regions. For example, if an original document having some regions with high density and other regions in white is copied (or printed), a toner attachment amount is small in the entire sheet, but a toner attachment amount is large in a specific part. There are cases where sheet curl occurs in a place where the toner attachment amount is large. The third embodiment is an implementation example for alleviating these circumstances.

Figure 23:
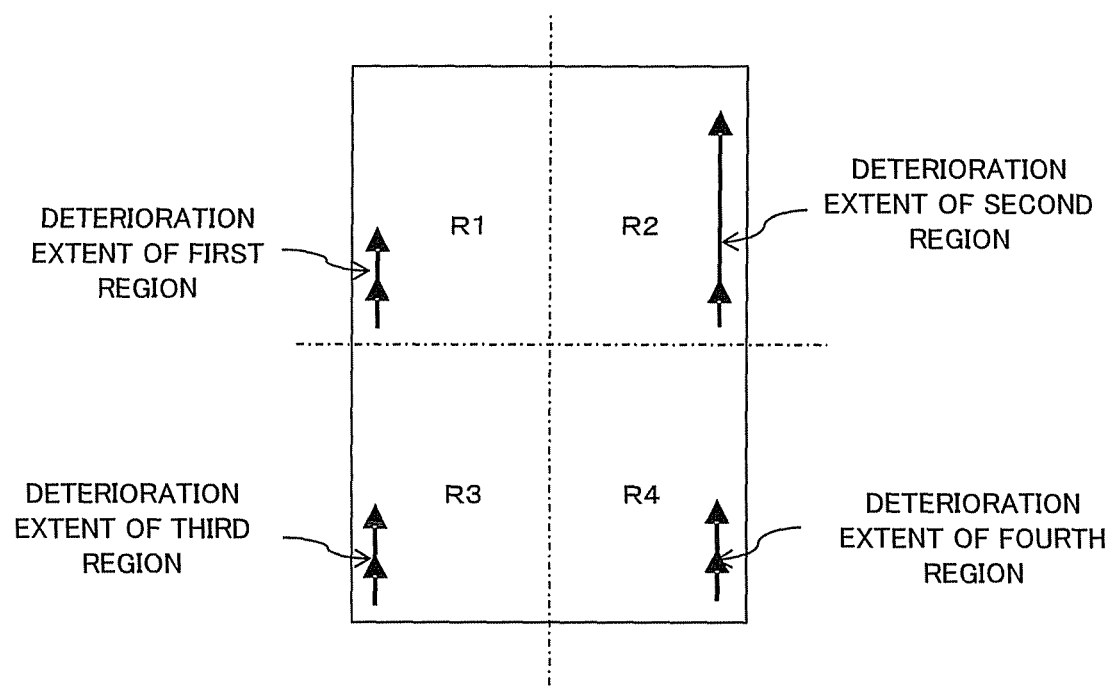
FIG. 23 is a diagram illustrating a division example where a sheet is divided into a plurality of regions so as to be processed, and an example where a deterioration mark is formed.

FIG. 23 shows an example of the region division. FIG. 23 is a diagram illustrating an example where the entire sheet is divided into four regions R1 to R4. The arrows recorded at the left and right ends are arrows corresponding to the respective regions.

A procedure of a detailed operation will be described. First, in the same manner as the first embodiment, in ACT 201 to ACT 204, the first image reading portion 31 reads a front surface of the sheet and inputs a first image signal, and reads a rear surface of the sheet and inputs a second image signal.

Next, in ACT 205, the image deterioration detection portion 33 calculates a toner attachment amount of each region on the basis of the first image signal.

First, the image deterioration detection portion 33 compares RGB signals of pixels with luminance threshold values thR, thG, and thB, with respect to the entire region of the first image signal, and extracts pixels satisfying the following expression as non-white pixels.

$(R<thR)$ or $(G<thG)$ or $(B<thB)$

Here, R, G, and B are RGB signal values of each pixel, and thR, thG, and thB are predefined luminance threshold values of RGB.

Next, the image deterioration detection portion 33 counts the number Nb1 of the non-white pixels from the region R1, and calculates a toner attachment amount Rate 11 of the region R1 from the total number Nt1 of pixels of the region R1 according to the following expression.

$$\text{Rate } 11 = Nb1/Nt1 \times 100 [\%]$$

The image deterioration detection portion 33 obtains toner attachment amounts Rate 12, Rate 13, and Rate 14 for the other regions in the same manner, and, in ACT 206, obtains Rate 21, Rate 22, Rate 23 and Rate 24 for the rear surface of the sheet in the same manner.

Next, in ACT 207, the decolorizing portion 6 decolorizes toner on the sheet in the same manner as the first embodiment. In addition, in the same manner as the first embodiment, in ACT 208 to ACT 211, the second image reading portion 32 reads a front surface image of the sheet and inputs a third image signal, and reads a rear surface image thereof and inputs a fourth image signal.

Next, in ACT 212, the deterioration mark detection portion 34 determines whether or not there is a deterioration mark by detecting a deterioration mark recorded for each region. First, RGB signals of pixels are compared with luminance threshold values thR, thG, and thB with respect to all the regions of the third image signal, and pixels satisfying the following expression are extracted as non-white pixels.

$(R<thR)$ or $(G<thG)$ or $(B<thB)$

Here, R, G, and B are RGB signal values of each pixel, and thR, thG, and thB are predefined luminance threshold values of RGB. Next, if there is the deterioration mark, the deterioration mark detection portion 34 takes projection for a place set in each region and thereby detects a direction of the deterioration mark and terminal end coordinates thereof in ACT 214 in the same manner as the first embodiment. The set place is a place, for example, along the sheet end of the corresponding region. Specifically, if the vertex coordinates of the upper left and the lower right of the first region are respectively (0, 0) and (X0, Y0), the set place is a rectangular place which has (X1, Y1) and (X2, Y2) as the vertex coordinates of the upper left and the lower right (if the upper left end in the region is the origin coordinates, X1 and Y1 are sufficiently small positive values, X2 is a small positive value satisfying X1<X2<X0, and Y2 is a sufficiently large positive value satisfying Y1<Y2<Y0).

In the same manner, the deterioration mark detection portion 34 detects deterioration marks, and detects directions and terminal end coordinates thereof with respect to the second region, the third region, and the fourth region (the loop process of No in ACT 215, ACT 220, and ACT 212). In addition, in the same manner as the front surface of the sheet, the deterioration mark detection portion 34 detects a deterioration mark from each region of the rear surface of the sheet using the fourth image signal, and, detects a direction of the deterioration mark and terminal end coordinates thereof if there is the deterioration mark (ACT 216 to ACT 219, and ACT 221).

Next, the deterioration mark recording portion 35 records arrows with lengths corresponding to the toner attachment amounts Rate 11[%], Rate 12[%], Rate 13[%], and Rate 14[%] in the respective regions. The present embodiment is the same as the first embodiment except that the region is divided and an arrow is recorded in each region. In other words, the processes in ACT 222 to ACT 224 are processes where the processes in ACT 018 to ACT 020 of FIG. 7 are performed with the region units, and the processes in ACT 226 to ACT 228 are processes where the processes in ACT 021 to ACT 023 of FIG. 7 are performed with the region units. In order to control a process for each region, the processes in ACT 225 and ACT 230 are performed for the front page, and the processes in ACT 229 and ACT 231 are performed for the rear page.

As described above instead of for the entire sheet, the sheet is divided into regions and a mark indicating a sheet deterioration extent for each region, thereby indicating a sheet deterioration extent more accurately.

In addition, in the above-described example, a description has been made of an operation of detecting non-white pixels using uniform threshold values for the entire sheet. However, if attention is paid to sheet curl, a curl which curves extremely only in a sheet end is likely to generate troubles (sheet cut and tear, sheet jam, and the like) in the image forming apparatus body than an entirely uniform curl. Therefore, for example, pixels of which a distance from the sheet end is within a predefined length L may use thR' (>thR), thG' (>thG), and thB' (>thB) which are values greater than the threshold values used for inside of the sheet, and thereby non-white pixels can be easily extracted from the sheet end. In addition, when a toner attachment amount is calculated, in the above-described example, the number of non-white pixels is merely counted. However, for example, a weighting coefficient w (>1) may be added to a non-white pixel with respect to pixels of which a distance from the sheet end is within a distance L. With this process, printing on the sheet end can further indicate that sheet deterioration progresses more than printing inside the sheet.

Fourth Embodiment

An operation example of the fourth embodiment will be described. The fourth embodiment is an implementation example regarding sheet discharge after a mark indicating sheet deterioration is detected.

In the fourth embodiment, after a deterioration mark is recorded, a discharge tray of a sheet is changed depending on an accumulated deterioration extent of the mark. This is because, when printing is performed reusing the sheet next time, a user may properly use sheets depending on situations. For example, if an image containing mainly text is printed, an increase in a toner attachment amount is small, and thus a sheet of which deterioration is in progress may be positively used from the viewpoint of reduction in environmental loads. Conversely, if an image where a toner attachment amount is large such as presentation materials or photographs, a user may use a sheet of which deterioration is small in order to prevent jamming, poor transfer, or poor fixing.

As described in the respective embodiments, it is possible to understand an accumulated sheet deterioration extent from, for example, a sum total of lengths of recorded arrows (sum of an existing mark and a new mark) using the deterioration mark detection portion 34. Therefore, discharge trays may be changed, for example, in the following three methods from a comparison result of a total L of lengths of arrows (a sum of lengths of an existing mark and a mark formed this time) with predefined reference values thL1 and thL2 (thL1<thL2). In addition, since lengths of arrows in both the front and rear surfaces are naturally different, in this case, a longer sum total L is used. Further, if a sheet is divided into regions as in the third embodiment, the longest sum total of arrows in all the regions is used as L.

If L<thL1: A sheet is discharged to a cassette which collects a reuse sheet of which deterioration is relatively slight.

If thL1<L<thL2: A sheet is discharged to a cassette which collects a sheet which is reusable but of which deterioration is in progress.

If thL2<L: A sheet is discharged to a cassette which collects a non-reusable (inappropriate for reuse) sheet.

Figure 24A:
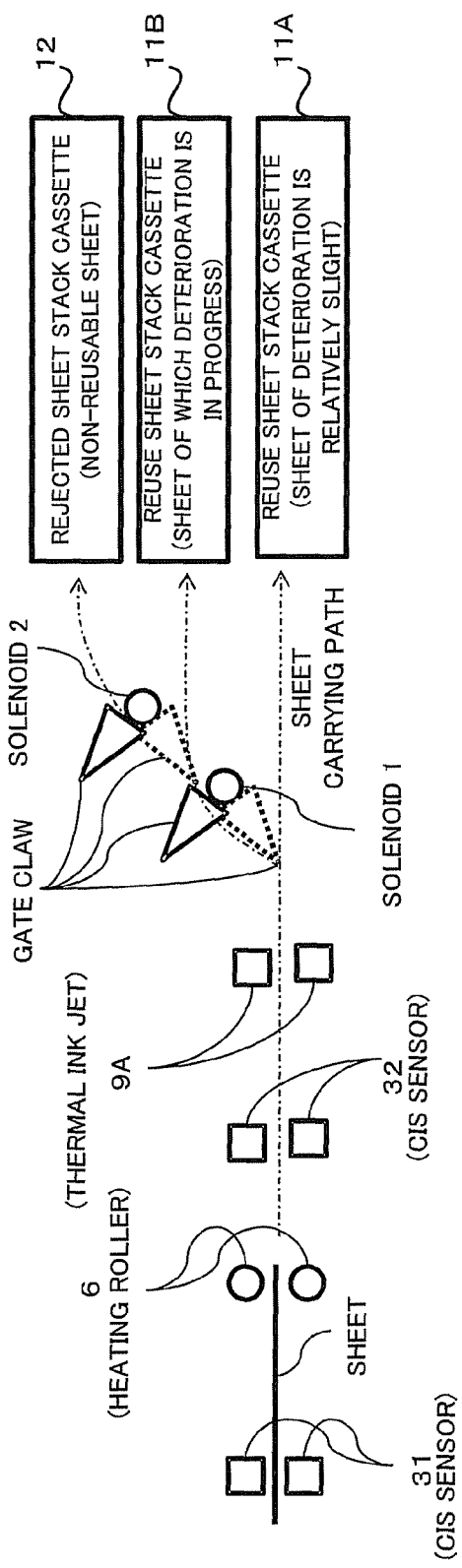
FIG. 24A is a diagram illustrating a configuration example according to a fourth embodiment (change in discharged destination).

Specifically, three kinds of cassettes are disposed as discharge destinations in the rear of the sheet carrying path of the recording medium reproducing apparatus 100 described in each embodiment, as shown in FIG. 24A. In other words, in the fourth embodiment, a reuse sheet stack cassette 11A which collects a sheet of which deterioration is relatively slight, a reuse sheet stack cassette 11B which collects a sheet of which deterioration is in progress, and a rejected sheet stack cassette 12 which collects a non-reusable sheet, are disposed.

In addition, gate claws are disposed on the sheet carrying path, and an angle of each of the gate claws is controlled depending on conduction (turned-on) or non-conduction (turned-off) of a solenoid. The conduction or non-conduction of the solenoid is controlled depending on a relationship between the sum total L of lengths of arrows and the reference values thL1 and thL2 as described above. In FIG. 24A, the gate claw forms an angle indicated by the dotted line when the solenoid is turned off, and forms an angle indicated by the solid line when turned on. In other words, in the fourth embodiment, the controller 14 controls conduction of the solenoid as described below on the basis of lengths of arrows in order to select a discharge cassette.

If L<thL1: Both the solenoids 1 and 2 are turned on (solid line).

If thL1<L<thL2: The solenoid 1 is turned off (dotted line), and the solenoid 2 is turned on (solid line).

If thL2<L: Both the solenoids 1 and 2 are turned off (dotted line).

Further, as a separate form of this implementation example, there may be implementation where sheet deterioration extents (a sum of an existing mark and a new mark) of the front surface and the rear surface of a sheet are compared with each other, and the surface of which sheet deterioration is slight is discharged to a tray so as to face upward (the surface of which sheet deterioration is slight so as to face in the same direction) at all times. This is because the next printing is easily performed on the surface of which sheet deterioration is slight and sheet curl is suppressed to be small. The sheet curl occurs due to one of factors that, when a sheet is overheated and is then cooled, toner is contracted, and the sheet is pulled by the toner. In addition, if a toner attachment amount of both surfaces of a sheet is approximately the same, the sheet curl is reduced since the sheet is pulled by the same force from both the surfaces. Therefore, the next printing is performed on a surface of which an accumulated toner attachment amount is smaller so as to decrease a difference in toner attachment amounts of both surfaces of the sheet as much as possible, thereby suppressing sheet curl.

Figure 24B:
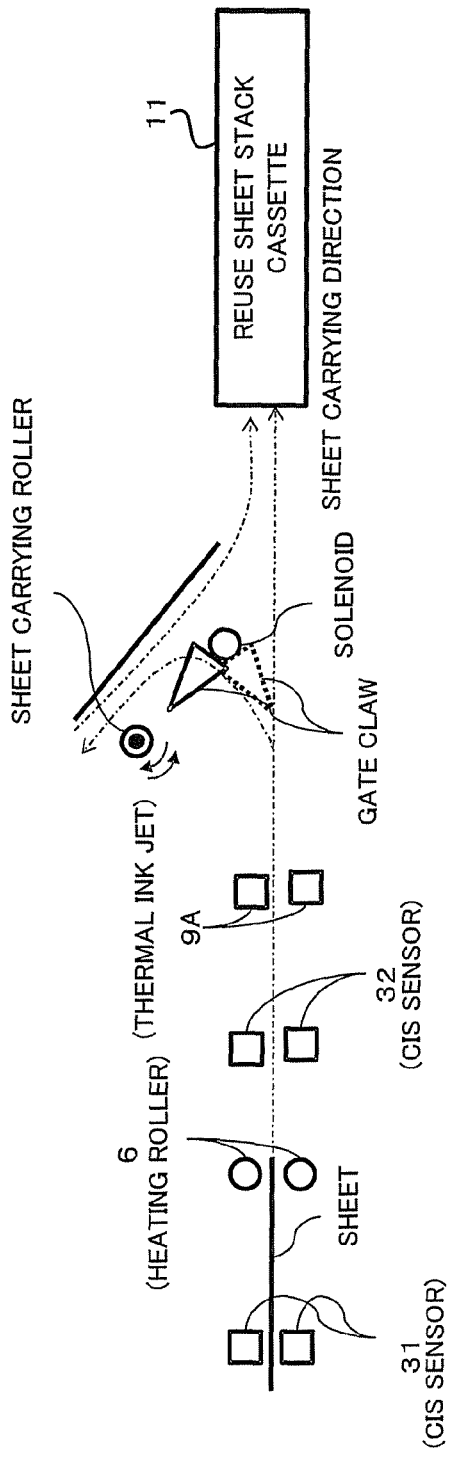
FIG. 24B is a diagram illustrating a configuration example (reversal of sheet surfaces).

As described in the respective embodiments, for example, it is possible to understand in which one of front and rear surfaces sheet deterioration is in progress from a sum total of lengths of recorded arrows. Therefore, as shown in FIG. 24B, if sheet deterioration of the front surface is slight, the sheet is discharged to the tray as it is. If sheet deterioration of the rear surface is slight, a mechanism which switchbacks the sheet is provided such that the sheet is reversed and is discharged to the tray. In the example shown in FIG. 24B, the gate claw forms an angle indicated by the dotted line when the solenoid shown singly is turned off, and forms an angle indicated by the solid line when turned on. In addition, the sheet carrying roller shown singly in FIG. 24B controls a rotation direction in a forward direction and a reverse direction. For example, if sheet deterioration of the front surface is slight, the solenoid is turned on (solid line), and the sheet is discharged to the tray in a straight line. On the other hand, if sheet deterioration of the rear surface is slight, first, the solenoid is turned off (dotted line), and the sheet is carried in the upper direction. At this time, the sheet carrying roller which is rotating in the counterclockwise direction by default is reversed in a rotation direction so as to rotate in the clockwise direction after the rear end of the sheet passes the gate claw, in response to a signal from the controller 14. Thereby, it is possible to reverse the front and rear surfaces of the sheet so as to be discharged to the tray.

As described above, according to the method described in the fourth embodiment, a discharge tray can be changed, or front and rear surfaces of a sheet can be aligned so as to be discharged depending on a sheet deterioration extent.

Fifth Embodiment

In the fifth embodiment, a description will be made of an implementation example of printing a mark such that a user can easily visually recognize that a sheet arrives at a deterioration extent limit. In addition, a block diagram is the same as that in the first embodiment (refer to FIG. 3).

Figure 25A:
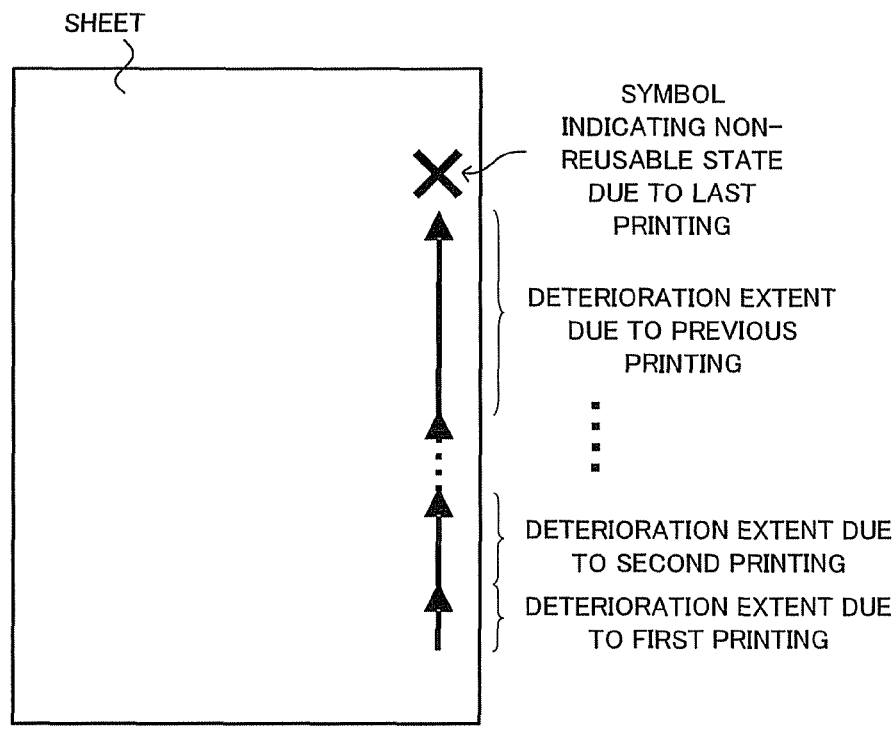
FIG. 25A is a diagram illustrating an example of the deterioration mark forming according to a fifth embodiment (x mark).
Figure 25B:
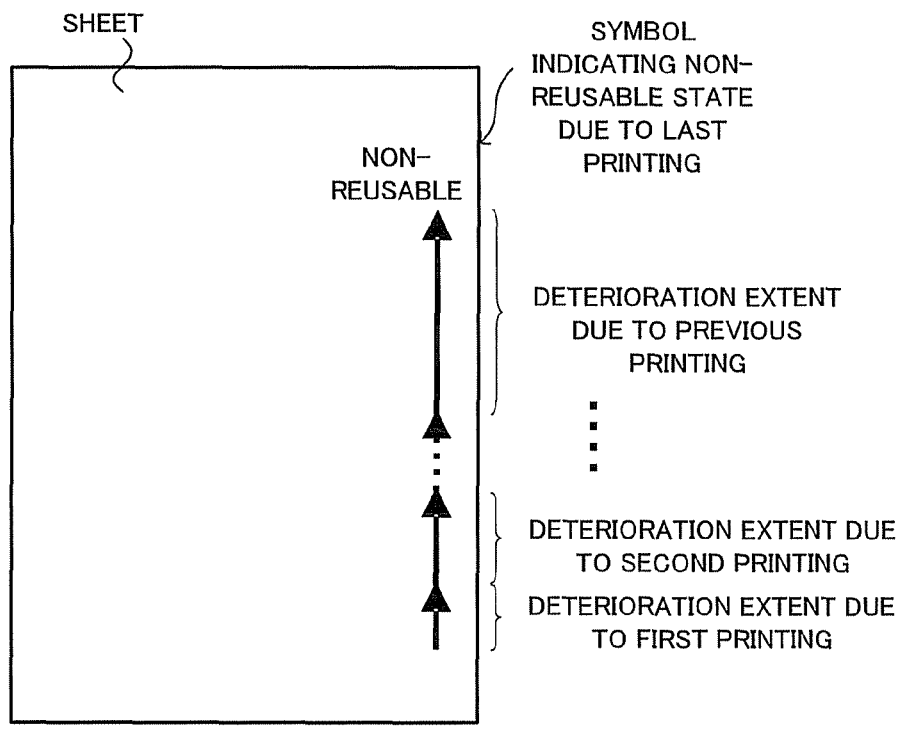
FIG. 25B is a diagram illustrating an example of the deterioration mark forming (character string).

Initially, a first aspect of the fifth embodiment will be described. First, a deterioration extent of a sheet is detected in the same manner as each embodiment. If the deterioration extent exceeds a predefined deterioration threshold value, the deterioration mark recording portion 35 prints a mark from which a user can intuitively understand that the sheet is non-usable. Specifically, as shown in FIGS. 25A and 25B, an "x" mark or characters such as "non-reusable" are printed at a position where the next arrow mark is printed in the first to fourth embodiments, thereby indicating that the sheet is not reusable any longer.

Figure 26:
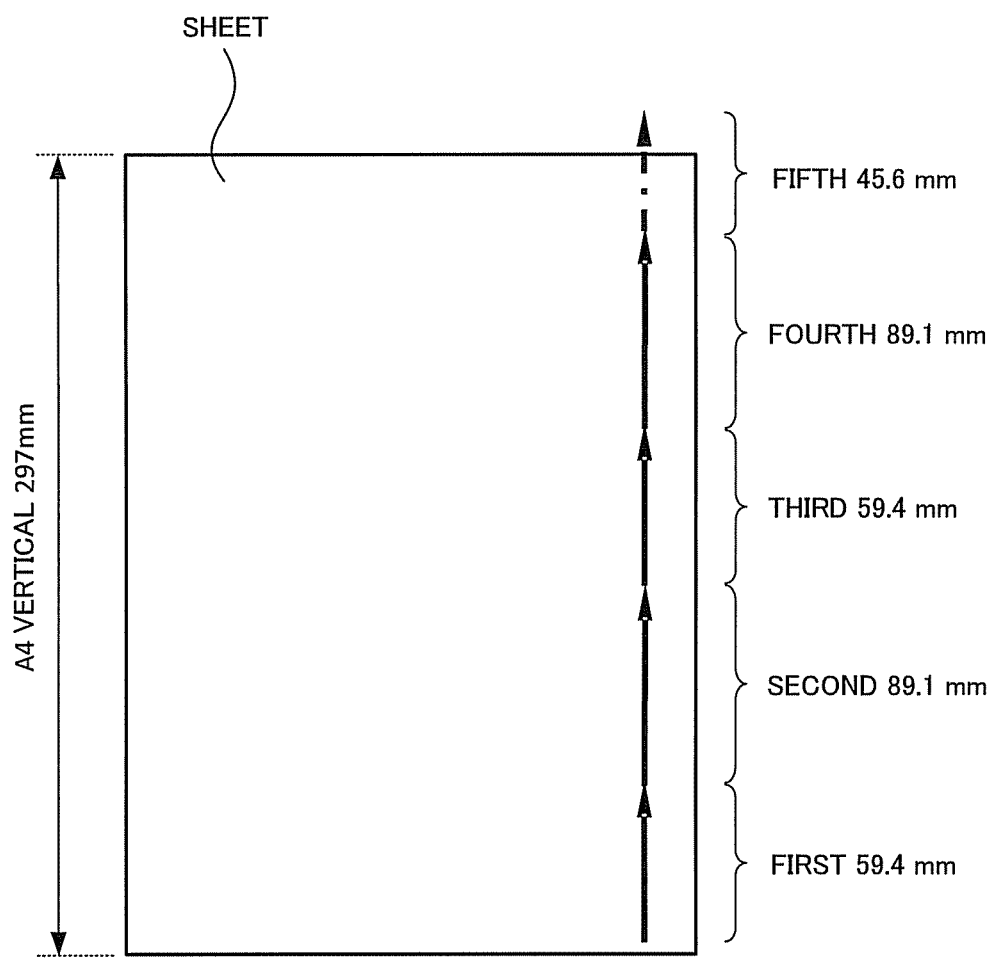
FIG. 26 is a diagram illustrating an example of the deterioration mark forming (partially not formed).

A second aspect will be described. In this aspect as well, as shown in FIG. 26, if an accumulated deterioration extent exceeds a reuse limit, an arrow mark indicating a deterioration extent is made to protrude from the sheet. FIG. 26 also shows a protruding part, but the protruding portion is not naturally printed on the sheet. Thereby, a user can intuitively understand that the sheet exceeds the reuse limit. For this reason, a length La of the arrow mark indicating a deterioration extent is calculated from the following expression. The controller 14 (the processor 8) performs this calculation.

$$La = Pt \times Lp / Thr$$

Here, Pt indicates a detected toner attachment ratio, Lp indicates a sheet length, and Thr indicates a non-reusable reference value of an accumulated toner attachment ratio.

A detailed example will be described. If the sheet has an A4 size (sheet length=297 mm), the non-reusable reference value of an accumulated toner attachment ratio is 100%, and a toner attachment ratio detected this time is 20%, a length La of an arrow to be printed this time is obtained as follows.

$$La = 20[\%] \times 297 \text{ [mm]} / 100[\%] = 59.4 \text{ [mm]}$$

For example, if the respective printings are performed at toner attachment ratios of 20%, 25%, 20%, 25% and 15%, as shown in FIG. 26, the fifth arrow protrudes from the sheet, and thus a user can intuitively understand that the sheet cannot be reused.

As described above, according to the fifth embodiment, a user can more intuitively determine whether or not a sheet is reusable without using a specific instrument.

Sixth Embodiment

A description has been made of an implementation example of changing a discharge destination of a sheet depending on a sheet deterioration extent in the fourth embodiment. However, allowable deterioration extents may be different depending on users. In addition, a deterioration extent may be desired to be determined only using the number of uses depending on users.

Figure 27:
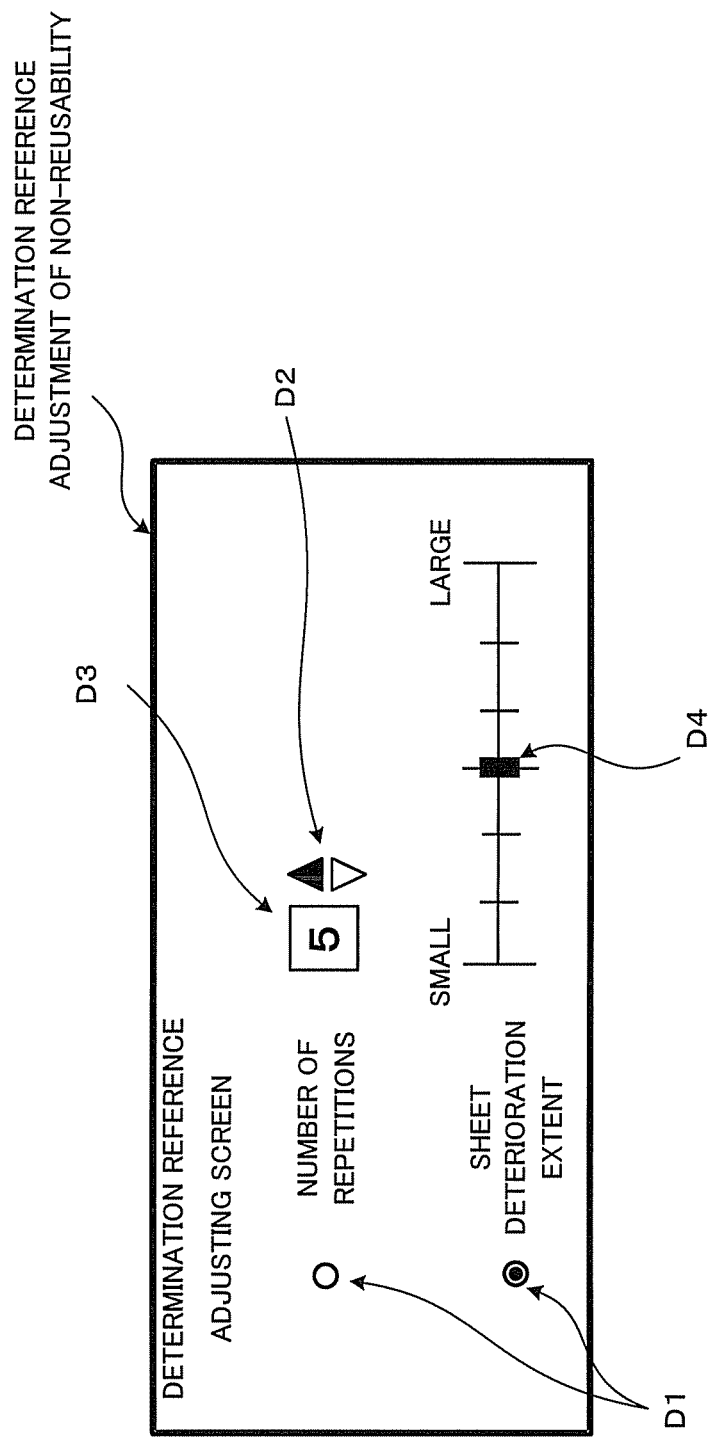
FIG. 27 is a diagram illustrating an example of a setting screen which is displayed by a display portion.

Therefore, the sixth embodiment provides a user interface which enables a user to adjust a determination reference for non-reusability. FIG. 27 shows a display example (determination reference adjusting screen) on the display portion 4. There is a determination reference changing button D1 on the determination reference adjusting screen, and, in this example, by the use of the radio button, it is possible to change determination of whether or not a sheet is reusable only using the number of repetitions, or determination of whether or not a sheet is reusable depending on a sheet deterioration extent in consideration of an accumulated toner attachment amount.

If the number of repetitions is set as a determination reference using the determination reference changing button D1, a user can further adjust how many times a sheet which is repeatedly printed and decolorized is a non-reusable sheet using an adjustment portion D2. Here, an adjusted value is displayed on a display region D3. The controller 14 compares the number of deterioration marks printed on a sheet, obtained through the same operation as in the first embodiment, with the input repetition number of non-reusability, and determines whether or not the sheet is reusable.

If the sheet deterioration extent is set as a determination reference using the determination reference changing button D1, a user can further adjust a determination reference of whether or not a sheet is reusable using the sheet deterioration extent using the adjustment portion D4. The controller 14 derives a sheet deterioration extent from a total sum of lengths of arrows printed on the sheet, obtained through the same operation as in the first embodiment, and compares the sheet deterioration extent with an input reference sheet deterioration extent determined as a non-reusable sheet, thereby determining whether or not the sheet is reusable.

Seventh Embodiment

In the first to sixth embodiments, a sheet deterioration extent is obtained by reading a state printed on a sheet with the scanner sensor 9 and calculating the state with the controller 14 (the processor 8). In other words, the recording medium reproducing apparatus 100 calculates a sheet deterioration extent on the basis of information printed on the sheet. However, there are cases where errors occur in obtained sheet deterioration extents depending on various factors such as the kind of sheet, temperature and humidity during printing, color unevenness of the scanner, and individual differences.

In the seventh embodiment, an image forming apparatus calculates a toner attachment amount from electronic data before being printed, and prints the attachment amount as a sheet deterioration extent using a decolorable toner. As methods of indicating the attachment amount, figures may be used, or a machine readable code mark such as a bar code or a QR code may be used.

Figure 28:
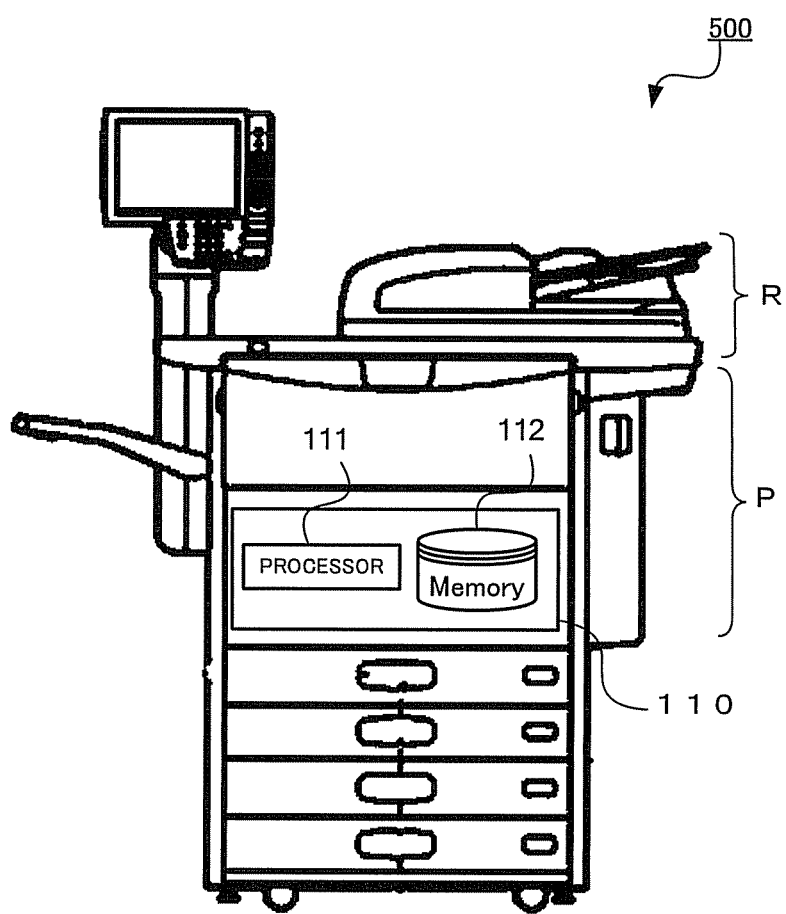
FIG. 28 is a diagram illustrating a configuration example of an image forming apparatus.

FIG. 28 shows an example of an image forming apparatus according to the seventh embodiment. The image forming apparatus 500 includes an original document reading portion R which reads an original document sheet, and an image forming portion P which forms an original document image read by the original document reading portion R or image data received from other apparatuses on a sheet. In addition, the image forming apparatus 500 includes a control board 110 which comprehensively controls hardware portions in the apparatus, and the control board 110 has a processor 111 which is a central processing unit and a memory 112 which is a nonvolatile storage device or a volatile storage device.

Here, not only in a copying operation but also in a printing operation, various image processes are performed for an input image signal in the control board 110, and then an image signal undergoing a grayscale process represented as error diffusion is generated and is transmitted to the image forming portion P. The control board 110 calculates a toner attachment amount R by applying the following expression to the image after the grayscale process is performed.

$$R=\Sigma(\alpha C+\beta M+\gamma Y+\delta K)$$

Here, C, M, Y, and K are respectively CMYK values of each pixel after the grayscale process is performed, and $\alpha$, $\beta$, $\gamma$, and $\delta$ are predefined weighting factors. A sum total of the overall image pixels is obtained through $\Sigma$.

Figure 29A:
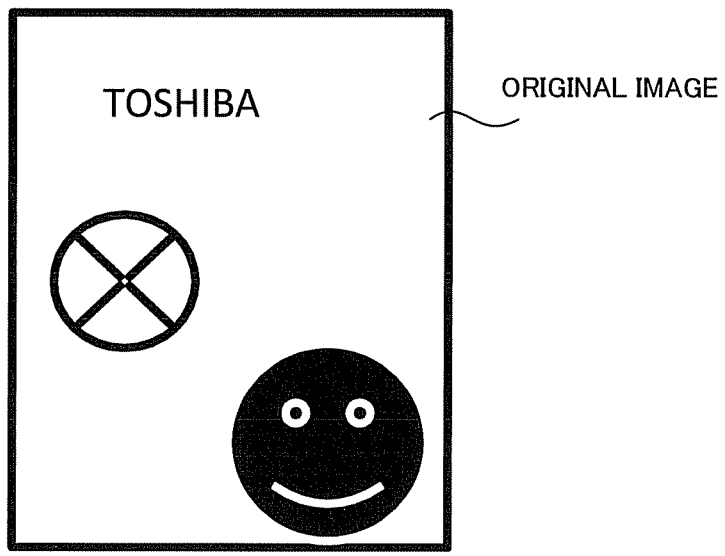
FIG. 29A is a diagram illustrating an example where an image forming apparatus according to a seventh embodiment forms an image (original image).
Figure 29B:
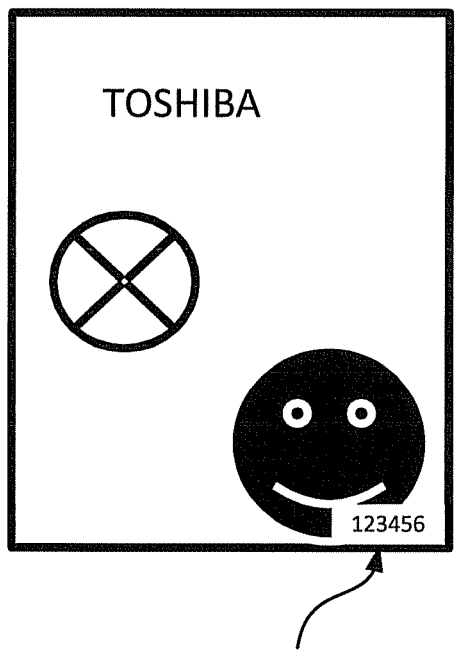
FIG. 29B is a diagram illustrating an example where the image forming apparatus forms an image (superimposition of figures).
Figure 29C:
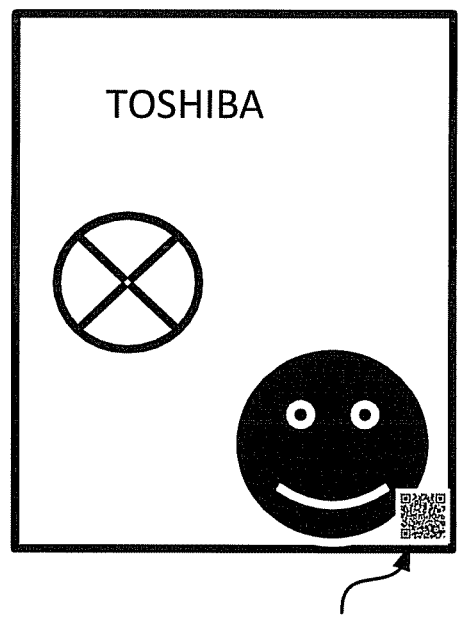
FIG. 29C is a diagram illustrating an example where the image forming apparatus forms an image (superimposition of a QR code).

Here, the control board 110 superimposes the obtained toner attachment amount on the image after the grayscale process is performed as a sheet deterioration extent so as to be transmitted to the image forming portion P. A detailed example of the superimposition is shown in FIGS. 29A to 29C. FIG. 29A shows an original image. FIG. 29B shows an example of directly burying a numerical value, and the control board 110 entirely fills a place where figures are written in white in advance and superimposes the numerical value thereon. FIG. 29C shows an example where a numerical value is coded and is then buried. The control board 110 entirely fills a place where a coded image is printed in white and then draws the coded image.

In addition, in the seventh embodiment, in both the cases where a numerical value is directly written and the case where a coded image is written, the writing is performed at a fixed position in no consideration of the content of the original image. However, a blank region may be searched for using a well-known technique, and printing is performed on the blank region.

If the sheet on which an image deterioration extent is printed, shown in FIGS. 29B and 29C, is input to the recording medium reproducing apparatus, as described in the first to sixth embodiments, a sheet deterioration extent is not calculated by the controller 14 (the processor 8) from an image signal which is read by the first and second image reading portions 31 and 32 but the sheet deterioration extent is acquired from a numerical value or a QR code directly written in the sheet, and a mark indicating the sheet deterioration extent is printed again with an undecolorable toner. In addition, it is possible to accurately read an image deterioration extent using an OCR technique if the image deterioration extent is directly written with a numerical value as shown in FIG. 29B, or using a decoding technique of a coded image if the image deterioration extent is written with a coded image as shown in FIG. 29C. Both the OCR technique and the decoding technique of a coded image are well-known techniques, and thus descriptions thereof are omitted here.

In the above example, a description has been made of an implementation example of printing a sheet deterioration extent with a numerical value or a QR code on a sheet, but there may be implementation in which the image forming apparatus 500 may print a sheet deterioration extent with an arrow or a concentric circle described in the first to sixth embodiments. In this case, the mark is printed with an undecolorable toner.

As described above, according to the seventh embodiment, a sheet deterioration extent is not obtained from an image read by the scanner through calculation by the processor, but a sheet deterioration extent which is accurately calculated and recorded in advance by the image forming apparatus is read, thereby recording a sheet deterioration extent on a reuse sheet with higher accuracy.

According to the recording medium reproducing apparatus of the first embodiment, a user can discriminate a sheet deterioration extent without using a specific instrument. In addition, according to the recording medium reproducing apparatus of the second embodiment, image reading after decolorizing which is required in the first embodiment is not performed, and a user can discriminate a sheet deterioration extent without using a specific instrument. Further, according to the recording medium reproducing apparatus of the third embodiment, since a sheet is divided into regions, and a sheet deterioration extent can be indicated for each region, a user can discriminate a sheet deterioration extent more accurately.

According to the recording medium reproducing apparatus of the fourth embodiment, it is possible to change a discharge tray depending on a sheet deterioration extent, or to discharge a sheet to a tray such that a surface of which sheet deterioration is slight faces in the same direction. Therefore, a user can easily select a reuse sheet or a reuse surface in accordance with its use when performing the next printing.

Further, according to the fifth embodiment, a user can more intuitively understand whether or not a sheet which is repeatedly printed and decolorized is reusable without any instrument. According to the sixth embodiment, a user can adjust a determination reference of whether or not a sheet is reusable. According to the seventh embodiment, information when an image is formed is buried during printing of a sheet, and thereby it is possible to record a deterioration extent more accurately.

In addition, in the respective embodiments, an example where the embodiments is implemented by the recording medium reproducing apparatus (decolorizing apparatus) and the image forming apparatus has been described, the embodiments may be provided as a mark forming apparatus having the functions described in the respective embodiments. The mark forming apparatus at least includes, as hardware devices, a control unit such as the controller 14 (the processor 8 and the storage portion 13) or the control board 110 (the processor 111 and the memory 112), a printer unit such as a mark printing portion 9A or the image forming portion P, and a scanning unit such as the scanner sensor 9 or the original document reading portion R, and realizes the functional blocks described in each embodiment.

A plurality of combinations of the implementations described in the respective embodiments may be provided as a recording medium reproducing apparatus (decolorizing apparatus), an image forming apparatus, and a mark forming apparatus.

The expressions shown in the respective embodiments are only an example, and a variety of implementation is possible.

In the respective embodiments, an example of forming a predetermined mark with a shape according to a color material attachment amount has been described, and an arrow or a circular mark has been shown as an example of the shape. Further, as an example of the shape according to a color material attachment amount, a length of an arrow (the length is different depending on a color material attachment amount)

or a radial length of a circle (the radial length is different depending on a color material attachment amount) has been shown.

As described above in detail, according to the technique disclosed in the present specification, since a sheet deterioration extent due to a plurality of uses can be printed on a sheet used by a user, information regarding sheet deterioration can be easily provided to the user, and thus the user also can easily ascertain the information.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A mark forming apparatus comprising:
   an image acquisition portion that scans and acquires an image formed on a sheet, the image is formed from a color material which can be decolorized by a decolorizer, wherein the image acquisition portion acquires the image before the decolorizer performs decolorizing;
   a calculation portion that calculates a color material attachment amount of the image from the image acquired by the image acquisition portion;
   a detection portion that detects a predetermined mark which is already formed on the sheet; and
   a formation portion that forms a predetermined mark with a different shape based on the color material attachment amount calculated by the calculation portion on the sheet in addition to the existing predetermined mark detected by the detection portion.

2. The apparatus according to claim 1, wherein the predetermined mark is formed from a color material which is not decolorized by the decolorizer.

3. The apparatus according to claim 2,
   wherein the detection portion detects an existing predetermined mark formed on the sheet after the decolorizer performs the decolorizing, and
   wherein the formation portion forms the predetermined mark on the sheet after the decolorizer performs the decolorizing.

4. The apparatus according to claim 2, wherein the image acquisition portion acquires the image before the decolorizer performs decolorizing,
   wherein the detection portion detects an existing predetermined mark formed on the sheet before the decolorizer performs the decolorizing, and
   wherein the formation portion forms the predetermined mark on the sheet after the decolorizer performs the decolorizing.

5. The apparatus according to claim 1, wherein the predetermined mark is a mark with an arrow shape, and
   wherein, if an existing arrow mark is formed on the sheet, the formation portion forms an arrow mark with a length according to the color material attachment amount in the same direction as the existing arrow mark such that a terminal end position of the existing arrow mark becomes a start end of the arrow.

6. The apparatus according to claim 1, wherein the predetermined mark is a circular mark, and
   wherein, if an existing circular mark is formed on the sheet, the formation portion forms a circular mark which has a length obtained by adding a length according to a color material attachment amount calculated by the calculation portion to a radial length of the existing circular mark and has a center conforming to a center of the existing circular mark.

7. The apparatus according to claim 1, wherein the image acquisition portion acquires images formed on a front surface and a rear surface of the sheet,
   wherein the calculation portion calculates a color material attachment amount of each of the images of the front surface and the rear surface,
   wherein the detection portion detects an existing predetermined mark for each of the front surface and the rear surface, and
   wherein the formation portion forms, on each sheet surface of the front surface and the rear surface, a predetermined mark corresponding to the surface.

8. The apparatus according to claim 1, wherein the image acquisition portion acquires images formed on a front surface and a rear surface of the sheet,
   wherein the calculation portion calculates a sheet deterioration amount of each of the images of the front surface and the rear surface,
   wherein the detection portion detects predetermined marks of the front surface and the rear surface, formed on one surface of the front surface and the rear surface, and
   wherein the formation portion forms a predetermined mark with a shape according to a color material attachment amount of the front surface on the one surface in addition to the predetermined mark of the front surface detected by the detection portion, and forms a predetermined mark with a shape according to a color material attachment amount of the rear surface on the one surface in addition to the predetermined mark of the rear surface.

9. The apparatus according to claim 1, wherein the calculation portion further obtains an accumulated amount of an attached color material on the basis of a shape of an existing predetermined mark detected by the detection portion, and compares the accumulated amount of the attached color material with a threshold value, and
   wherein the formation portion displays non-reusability on the sheet if the accumulated amount of the attached color material exceeds the threshold value.

10. The apparatus according to claim 1, wherein the calculation portion divides the image obtained by the image acquisition portion into a plurality of regions, and calculates a color material attachment amount for each region from the image of each region,
    wherein the detection portion detects the existing predetermined mark for each region, and
    wherein the formation portion forms a predetermined mark with a shape according to the color material attachment amount in each region in addition to the existing predetermined mark detected by the detection portion.

11. The apparatus according to claim 1, wherein the calculation portion further obtains an accumulated amount of an attached color material on the basis of a shape of the existing predetermined mark detected by the detection portion, and performs control such that the sheet is discharged to one of a plurality of discharge trays by comparing a value obtained by summing the accumulated amount of the attached color material and a color material attachment amount calculated by the calculation portion with one or a plurality of regulated values.

12. The apparatus according to claim 1, wherein the image acquisition portion acquires images formed on a front surface and a rear surface of the sheet,
   wherein the detection portion detects an existing predetermined mark for each of the front surface and the rear surface, and
   wherein the calculation portion further obtains an accumulated amount of an attached color material of each of the front surface and the rear surface on the basis of a shape of the predetermined mark detected by the detection portion, and performs control for reversing the sheet such that the surface of which the accumulated amount of the attached color material is smaller faces in the same direction.

13. The apparatus according to claim 1, wherein the calculation portion further obtains an accumulated amount of an attached color material on the basis of a shape of an existing predetermined mark detected by the detection portion, and compares the accumulated amount of the attached color material with a threshold value, and
   wherein the formation portion forms the mark such that a part of the predetermined mark protrudes from a range of the sheet if the accumulated amount of the attached color material exceeds the threshold value.

14. The apparatus according to claim 1, wherein the formation portion displays a reuse limit of the sheet in a sheet region in which the predetermined mark is formed.

15. The apparatus according to claim 1, wherein the formation portion forms a symbol at a terminal end position of the predetermined mark if the predetermined mark is formed.

16. The apparatus according to claim 1, wherein the formation portion forms a scale which is used as a reference of a size of an accumulated shape of the predetermined mark in a sheet region in which the predetermined mark is formed.

17. An image forming apparatus comprising:
   an image acquisition portion that acquires an image formed on a sheet, the image is formed from a color material which can be decolorized by a decolorizer, wherein the image acquisition portion acquires the image before the decolorizer performs decolorizing;
   a calculation portion that calculates a color material attachment amount of the image from the image acquired by the image acquisition portion; and
   a formation portion that forms a different shape based on the color material attachment amount calculated by the calculation portion on the sheet.

18. A mark forming method of an apparatus printing a mark on a sheet, comprising:
   scanning and acquiring an image formed on a sheet, the image is formed from a color material which can be decolorized by a decolorizer, wherein the image is acquired before the decolorizer performs decolorizing;
   calculating a color material attachment amount of the image from the acquired image;
   detecting a predetermined mark which is already formed on the sheet; and
   forming a predetermined mark with a different shape based on the calculated color material attachment amount on the sheet in addition to the detected existing predetermined mark.

19. The method according to claim 18, wherein the predetermined mark is formed from a color material which is not decolorized by the decolorizer.

20. The method according to claim 18, wherein the predetermined mark is a mark with an arrow shape, and
   wherein, if an existing arrow mark is formed on the sheet, an arrow mark with a length according to the color material attachment amount is formed in the same direction of the existing arrow mark such that a terminal end position of the existing arrow mark becomes a start end of the arrow.

* * * * *